United States Patent
Antonucci et al.

(10) Patent No.: US 9,303,619 B2
(45) Date of Patent: Apr. 5, 2016

(54) HYDROKINETIC ENERGY CONVERSION SYSTEM WITH BUOYANCY AND BALLAST CONTROLS TO HARNESS UNDERWATER CURRENTS FOR THE GENERATION OF ELECTRICAL POWER

(71) Applicant: Hydro Alternative Energy, Inc., West Palm Beach, FL (US)

(72) Inventors: Mark Antonucci, Boynton Beach, FL (US); Mark A. Leber, Boca Raton, FL (US); Joel C. Haas, Jupiter, FL (US); David L. Dupont, North Palm Beach, FL (US)

(73) Assignee: Hydro Alternative Energy, Inc., West Palm Beach, FL (US)

( * ) Notice: Subject to any disclaimer, the term of this patent is extended or adjusted under 35 U.S.C. 154(b) by 725 days.

(21) Appl. No.: 13/679,268

(22) Filed: Nov. 16, 2012

(65) Prior Publication Data

US 2014/0138954 A1    May 22, 2014

(51) Int. Cl.
*F03B 1/00* (2006.01)
*F03B 17/06* (2006.01)

(52) U.S. Cl.
CPC ............ *F03B 17/061* (2013.01); *F03B 17/062* (2013.01); *F03B 17/065* (2013.01); *F05B 2240/13* (2013.01); *F05B 2240/97* (2013.01); *F05B 2270/18* (2013.01); *Y02E 10/28* (2013.01)

(58) Field of Classification Search
CPC ...... F03B 13/22; F03B 17/061; F03B 17/062; F03B 17/065; F05B 2240/13; F05B 2240/97; F05B 2270/18; Y02E 10/28
USPC ........................................................ 60/398
See application file for complete search history.

(56) References Cited

U.S. PATENT DOCUMENTS

| 4,095,918 | A | * | 6/1978 | Mouton, Jr. | F03B 11/02 290/54 |
| 8,847,421 | B2 | * | 9/2014 | Bolin | F03B 17/061 290/55 |
| 2007/0241566 | A1 | * | 10/2007 | Kuehnle | F03B 17/061 290/53 |

FOREIGN PATENT DOCUMENTS

| DE | 10134509 A1 | * | 5/2002 | .............. F03B 3/04 |
| DE | 102010025070 A1 | * | 12/2011 | .............. F03B 13/10 |
| WO | WO 2007107505 A1 | * | 9/2007 | .............. F03B 13/10 |

* cited by examiner

*Primary Examiner* — Nathaniel Wiehe
*Assistant Examiner* — Logan Kraft
(74) *Attorney, Agent, or Firm* — Robert C. Kain, Jr.

(57) ABSTRACT

The hydrokinetic energy conversion system uses, in one embodiment, a perpendicular turbine coupled to an electrical generator and a laminar water flow shroud. The ballast and buoyancy system includes hydrofoils defining lateral sides of the shroud mounted on upper and lower decks. Ballast chambers are defined in some or all of the foils and each has a gas intake port and a water ballast output port. The shroud carries a source of compressed air, valves for control of air flow into the ballast chambers. The ballast and buoyancy system includes a control system with sensors for depth, pitch, yaw and roll of the shroud which generates valve control commands. Another embodiment utilizes an inline turbine and a radial water flow shroud with a plurality of circumferential hydrofoils. Struts mount the turbine near the primary hydrofoil and braces attach ring hydrofoils together. Alternatively, ballast chambers are defined in outboard-mounted ballast pods.

35 Claims, 19 Drawing Sheets

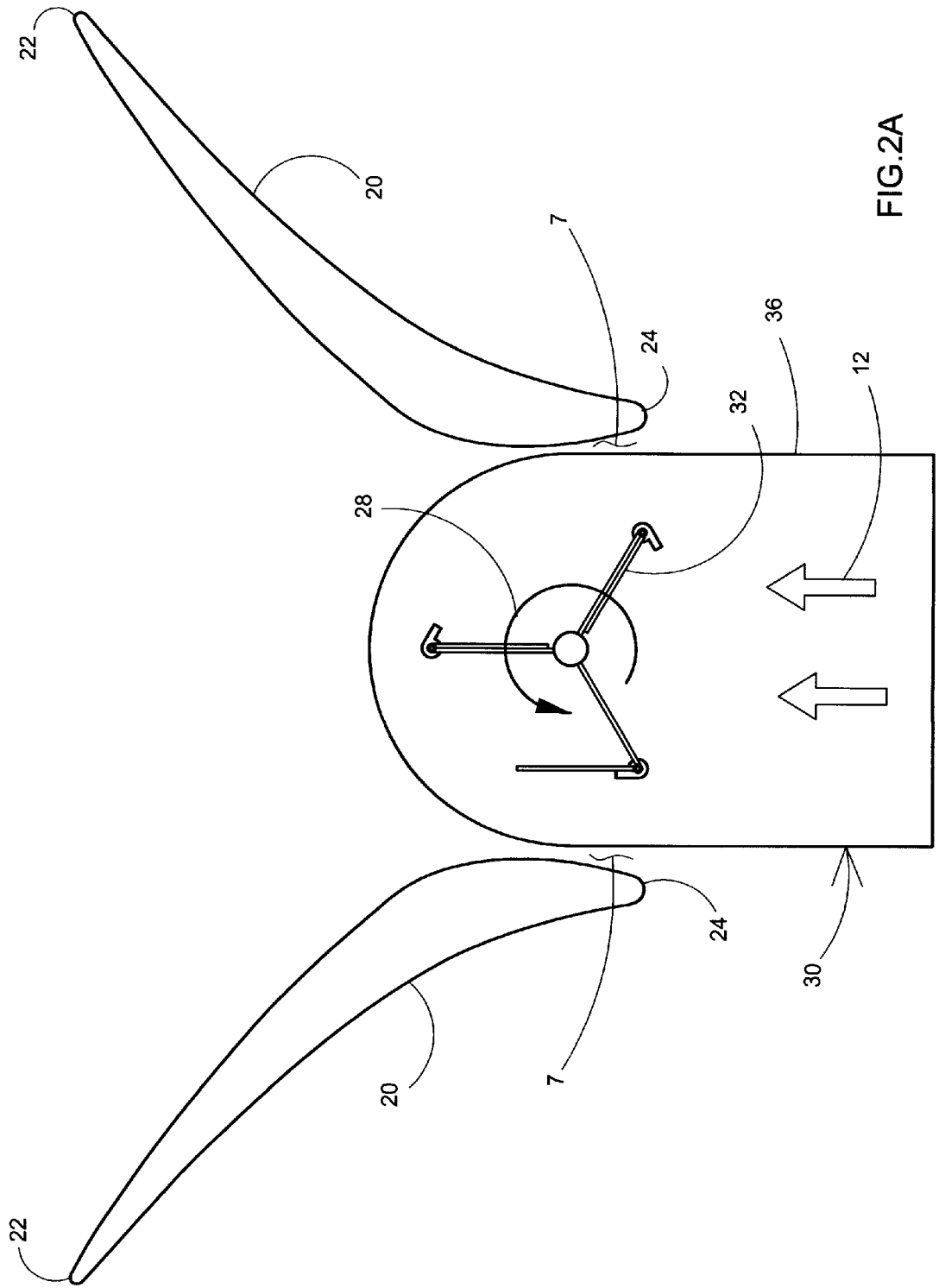

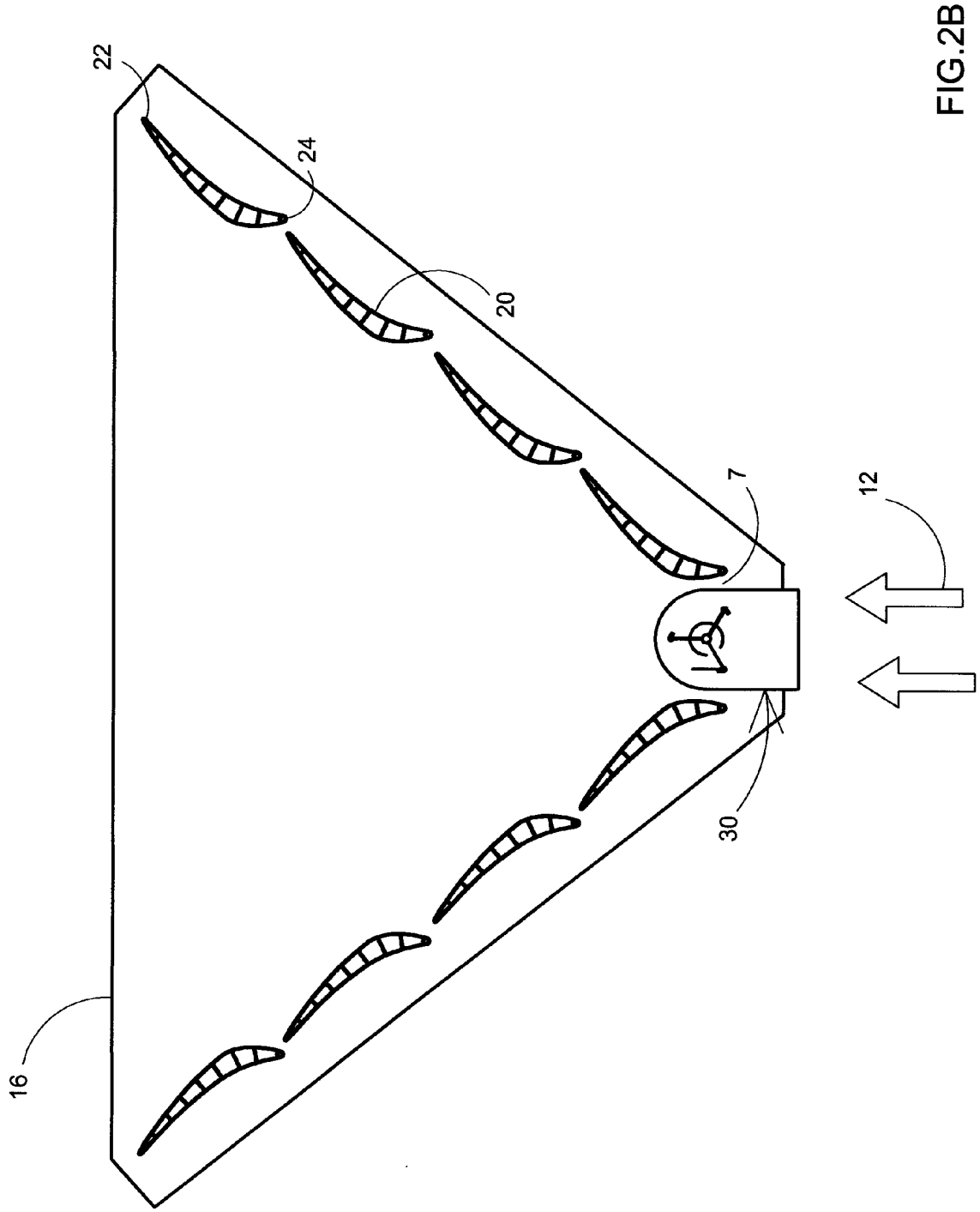

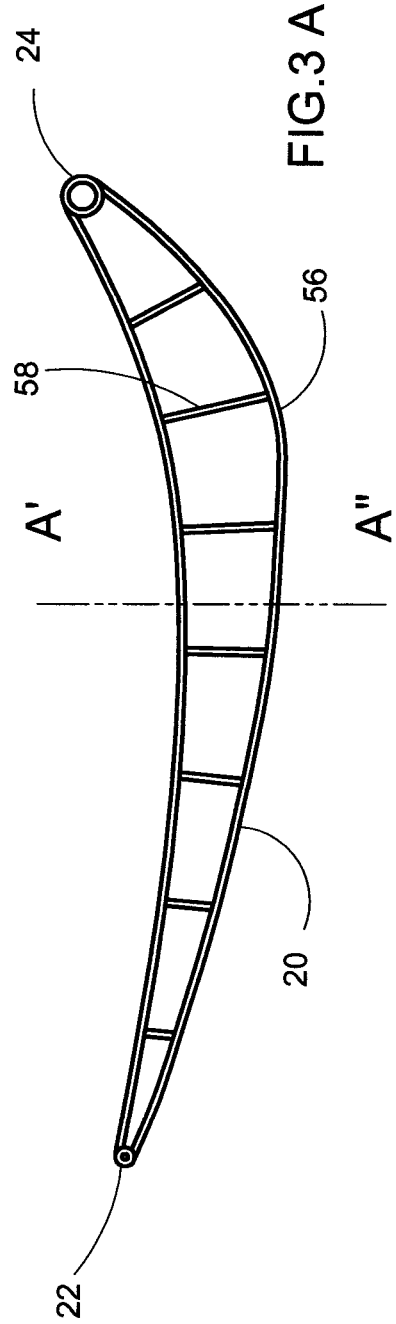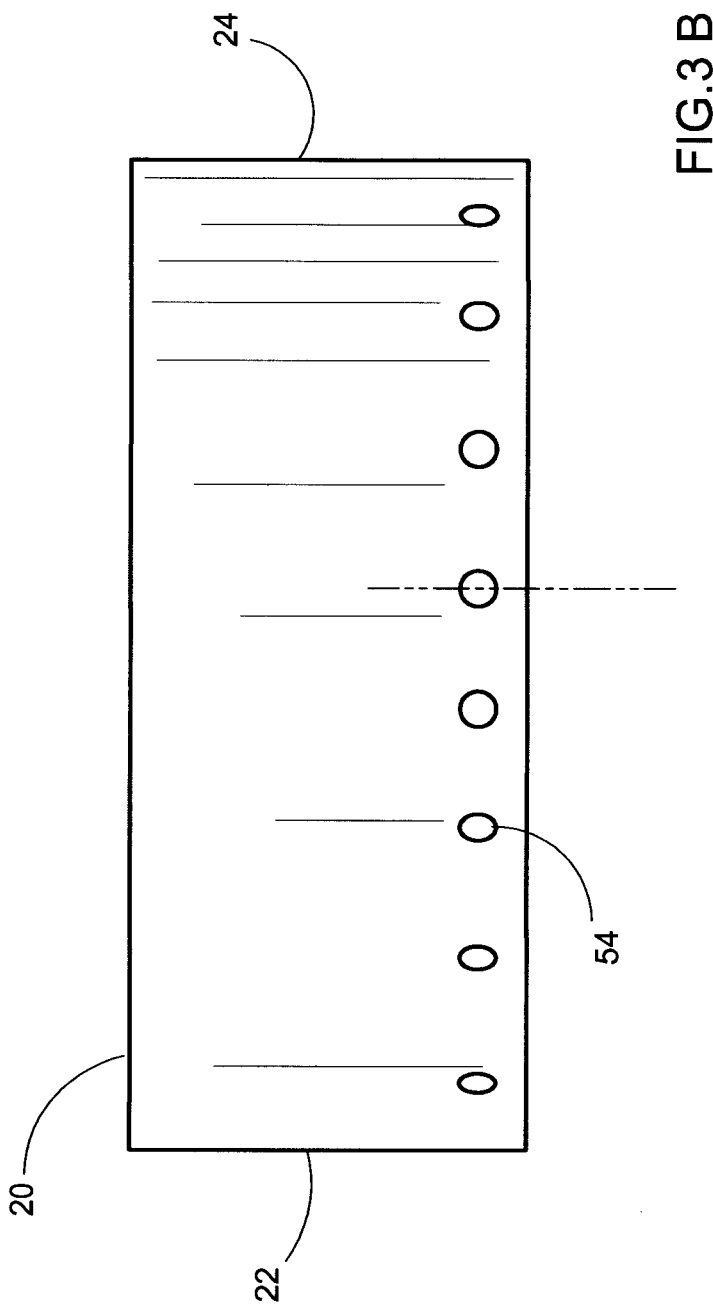

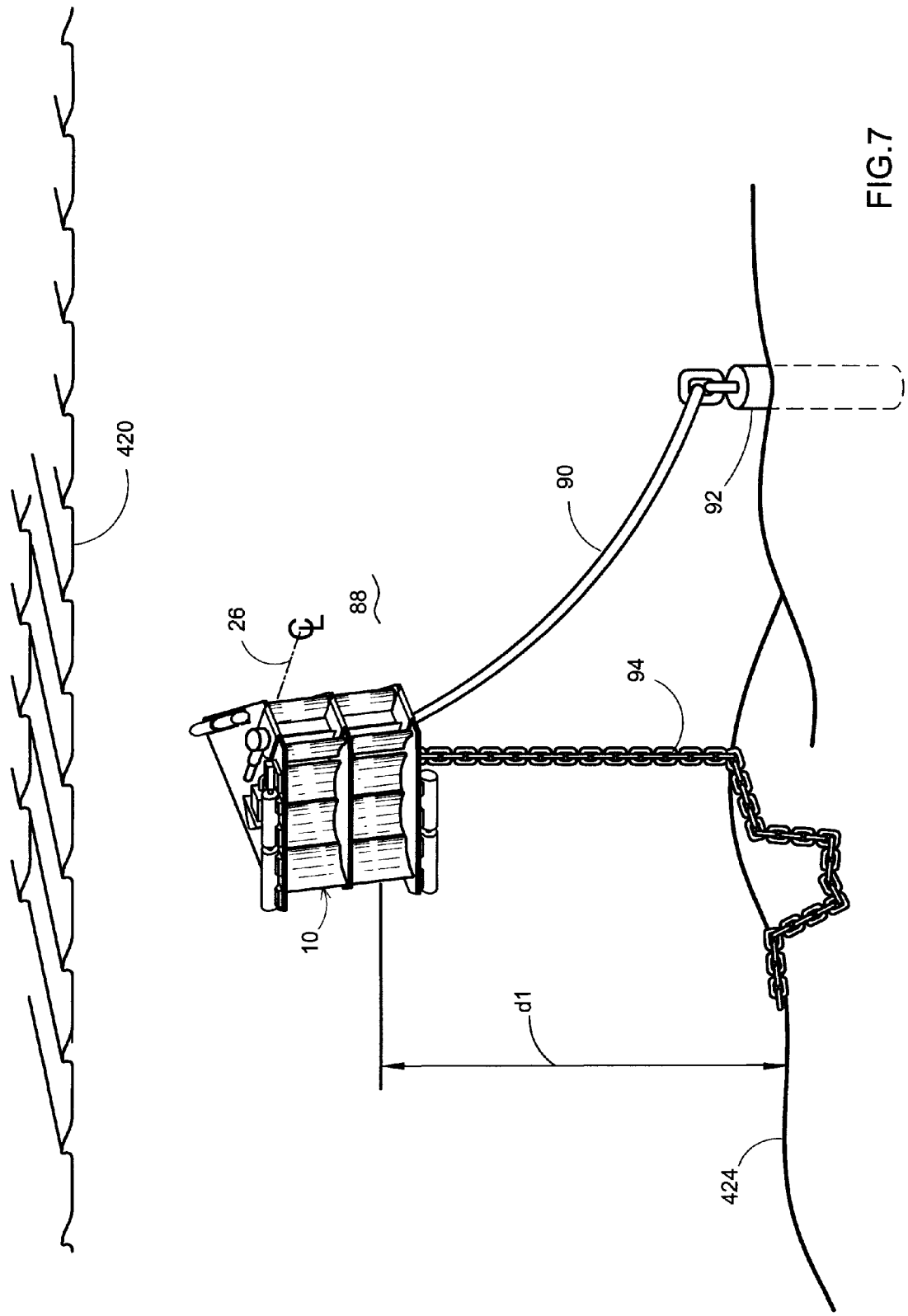

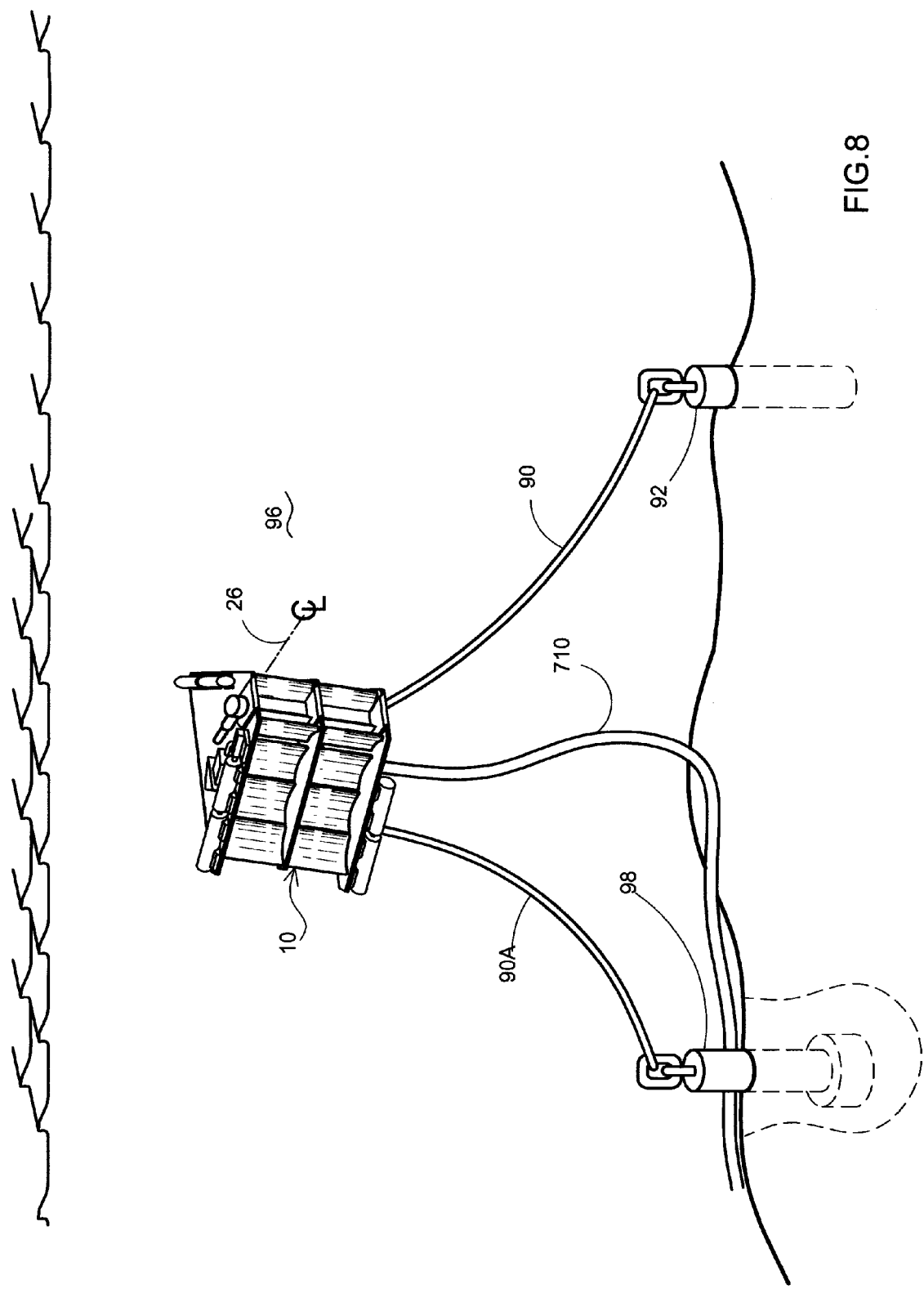

HYDROKINETIC ENERGY CONVERSION SYSTEM WITH BUOYANCY AND BALLAST CONTROLS TO HARNESS UNDERWATER CURRENTS FOR THE GENERATION OF ELECTRICAL POWER

The present invention relates to a system which converts hydrokinetic underwater current flow into electrical power.

BACKGROUND OF THE INVENTION

Prior art systems utilize flowing water from dams, called hydroelectric plants, to generate electrical power. Additionally, turbines have been used to convert wind or airflow into electrical power. However, there is a deficiency in utilization of slow moving, underwater current flows, particularly underwater ocean currents.

Velocity is a factor in the amount of hydrokinetic energy that can be extracted from flowing water. Several prior art hydrokinetic electrical generators work in very high velocity or flow environments, such as in the range of 3, 4 or 5 meters per second (about 6, 8 or 10 knots). While these high water velocities offer the potential for the extraction of large amounts of hydrokinetic energy, these velocities are present in a very small percentage of the world's ocean waters.

Flow velocity is only one factor in utilizing hydrokinetic energy. A second factor is the location of useful water currents in the ocean. Open ocean currents usually differ from the ocean floor currents, which, in turn, differ from ocean surface currents. Generally, maximum ocean currents are found near the surface, at relatively shallow depths, and slower moving currents are found near the bottom of the ocean.

Therefore, buoyancy of a hydrokinetic system useful to capture energy from ocean currents is a factor in (a) locating a reasonably optimal depth of operation for the hydrokinetic system; (b) maintaining the depth to achieve an optimal operation; and (c) controlling the pitch, yaw and roll of the system. Further, since the currents in a certain geographic location change over time (daily, monthly or otherwise), a buoyancy and ballast control system for elevation above the ocean floor (depth control) and pitch, yaw and roll control is necessary to effect the extraction of hydrokinetic energy from ocean currents.

OBJECTS OF THE INVENTION

It is an objective of the present invention to use hydrokinetic water flows at many locations throughout the world utilizing water flows which are typical water conditions.

It is another objective of the present invention to provide a hydrokinetic energy conversion system which operates in low current flow conditions, such as in low velocity conditions of 1-2 meters per second (2-4 knots).

It is an additional object of the present invention to have a system which is positively buoyant and either secured to the ocean floor or designed to float at a certain predetermined depth (elevation above the ocean floor) while moored to the ocean floor.

It is another object of the present invention to provide an electrical generation system utilizing a perpendicular panel-type turbine in conjunction with laminar flow shroud formed, in part, by a plurality of hydrofoils.

In a different embodiment, it is an object of the present invention to provide an electrical generation system utilizing an inline or axial turbine with a plurality of circumferential or ring hydrofoils (a radial flow shroud).

It is an additional object of the present invention to provide a ballast and buoyancy system utilizing compressed air stored on the shroud (whether a laminar flow shroud or a radial flow shroud).

It is another object of the present invention to provide a control system controlling compressed air injected and ejected (changing the amount of ballast) from the ballast defining hydrofoils.

It is an additional object of the present invention to deploy stabilization ballast pods outboard of the radial shroud system.

SUMMARY OF THE INVENTION

The hydrokinetic energy conversion system uses, in one embodiment, a perpendicular turbine coupled to an electrical generator and a laminar water flow shroud channeling water current flow about the perpendicular turbine. A unique ballast and buoyancy system includes a plurality of pairs of hydrofoils defining lateral sides of the shroud. Each hydrofoil pair is defined by opposing foils directing downstream water flow away from the perpendicular turbine. These hydrofoils are mounted between upper and lower deck plates which define upper and lower limits of laminar flow past the turbine. The opposing foils define lateral limits of laminar flow past the turbine. A plurality of ballast chambers are defined in interior spaces of some or all of the foils. Each ballast chamber has a gas intake port and a water ballast output port. These ballast ports permit the ingress or egress ambient water which acts as ballast for the ballast defining foils. Typically, the shroud carries a source of compressed air. A plurality of valves, intermediate the source of compressed air and the ballast chambers, control the flow of air into the ballast chambers and further control the release of air from the ballast chambers. The valves may be two-way valves which controllably release air (thereby adding water ballast to the ballast defining chambers). The primary valving introducing air into the ballast chambers (ejecting water ballast). The secondary valving releasing air form the ballast chambers. The ballast and buoyancy system includes a control system with sensors as control inputs monitoring depth or elevation above an ocean floor, pitch, yaw and roll of the shroud. The control system generates valve control commands to respective valves to inject or release air to and from corresponding ballast chambers in respective ballast defining foils.

Another embodiment utilizes an inline or axial turbine coupled to an electrical generator and a radial water flow shroud channeling water current flow about the inline turbine. The ballast and buoyancy system includes a plurality of circumferential hydrofoils with a primary circumferential ring hydrofoil disposed proximal the turbine. Accelerated flow of water or fluid comes from the external or outbound foil surface through the space between the primary shroud and the secondary shrouds. The remaining circumferential hydrofoils are disposed downstream the primary circumferential hydrofoil and direct downstream water flow away from an axial centerline of the turbine. The remaining circumferential hydrofoils define secondary circumferential hydrofoils. A plurality of struts mount the turbine on or about the axial centerline of the primary circumferential hydrofoil. A plurality of shroud braces mount the primary circumferential hydrofoil to an adjacent secondary circumferential hydrofoil and mount other adjacent secondary circumferential hydrofoils to each other. A plurality of ballast chambers are defined in interior spaces of some or all of the circumferential hydrofoils. Each ballast chamber having a gas intake port and a water ballast output port. These ballast ports permit the ingress or egress ambient water as ballast for the ballast defining circumferential hydrofoils. The radial flow system uses air tanks, valves and controls and sensors similar to the laminar flow.

In another embodiment, the ballast control tanks are disposed or hung on or about the outboard sides of the radial shrouds. These ballast pods include ballast controls, passive and hard ballast tanks and sources of compressed air for soft ballast control volumes for the system.

BRIEF DESCRIPTION OF THE DRAWINGS

Further objects and advantages of the present invention can be found in the detailed description of the preferred embodiments when taken in conjunction with the accompanying drawings in which:

FIG. 2A is a diagrammatic view of the rotating panel perpendicular hydraulic turbine and a pair of opposing hydrofoils defining the primary hydrofoil pair (each pair including opposing hydrofoils).

FIG. 2B is a sectional view through FIG. 2 (the sectional view taken from a plane A-A in FIG. 2 intermediate the top shroud deck plate and the mid-section shroud deck plate).

FIG. 3A is a sectional view of one hydrofoil in the shroud.

FIG. 3B is a side view of the foil showing ballast relief ports.

FIG. 7 shows a hydraulic flow generator system with a drag line mooring system.

FIG. 8 depicts a pile mooring system for hydraulic flow generator system.

DETAILED DESCRIPTION OF THE PREFERRED EMBODIMENTS

The present invention relates to a hydrokinetic energy conversion system with buoyancy and ballast controls which harness underwater current for the generation of electrical power. FIGS. 1-5 generally illustrate a laminar flow shroud used in connection with a perpendicular panel turbine. FIGS. 6-6B generally show a radial flow shroud with an inline or axial turbine. FIGS. 7 and 8 diagrammatically illustrate some mooring systems. It should be noted that although a laminar flow hydrofoil is shown in FIGS. 7 and 8, the hydrofoils in the radial flow conversion system may include the same features. FIG. 9 diagrammatically illustrates a process control system for the ballast and buoyancy control.

Figure 4:
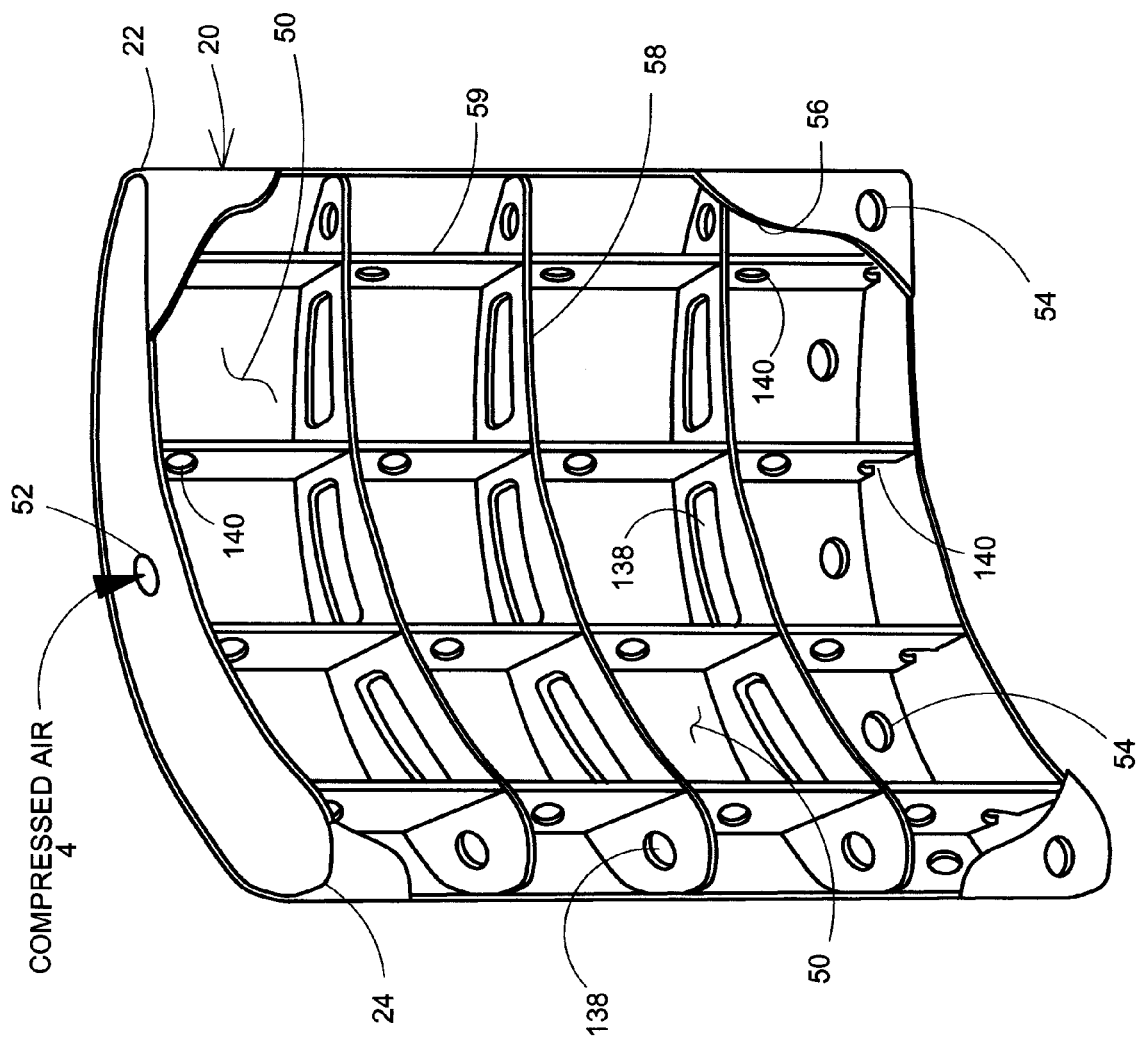
FIG. 4 is an internal view of the foil with vertical and horizontal internal support struts or stringers.
Figure 4A:
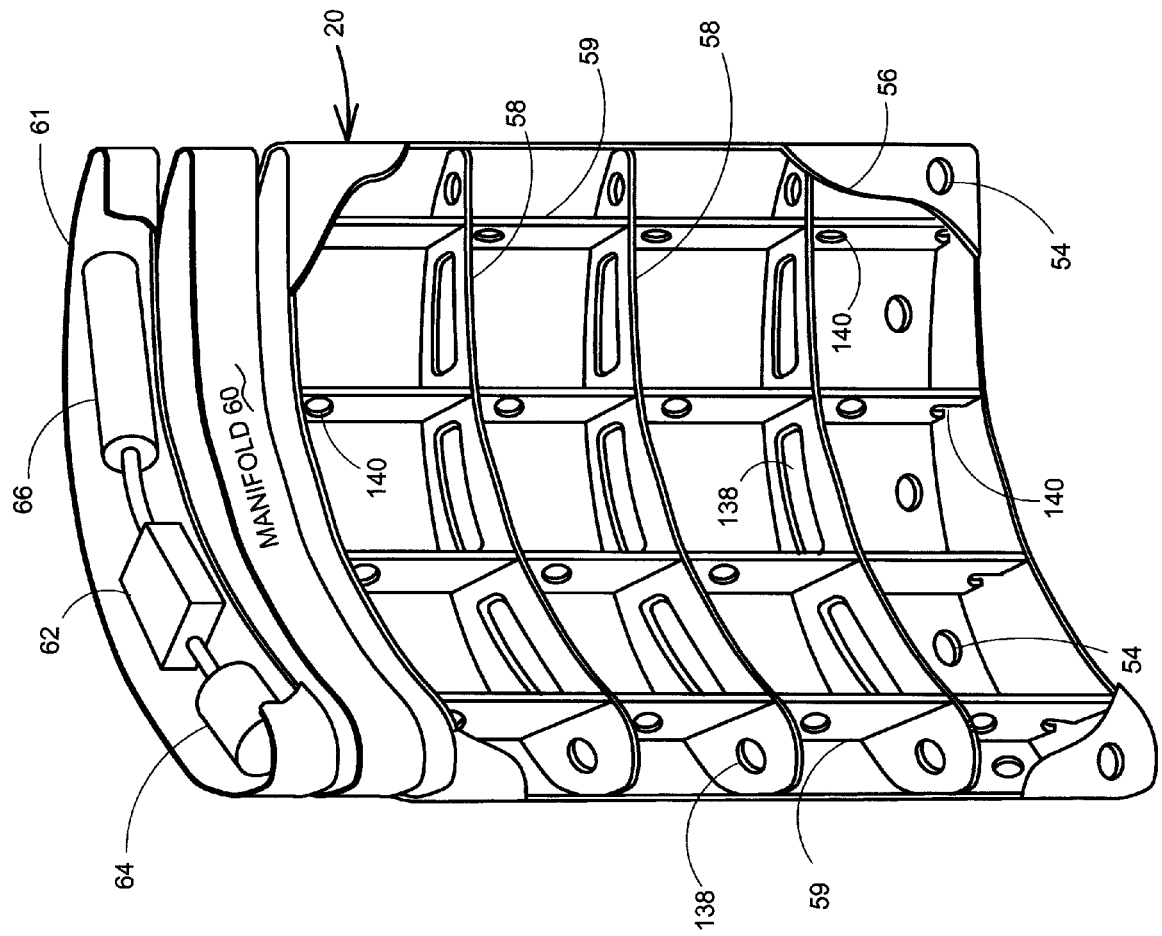
FIG. 4A is an internal view of a hydrofoil with a ballast control system and a distribution manifold both contained in foil-shaped containment structures (the space between the control, the manifold and the foil being illustrated as an exploded view in the drawing).
Figure 5:
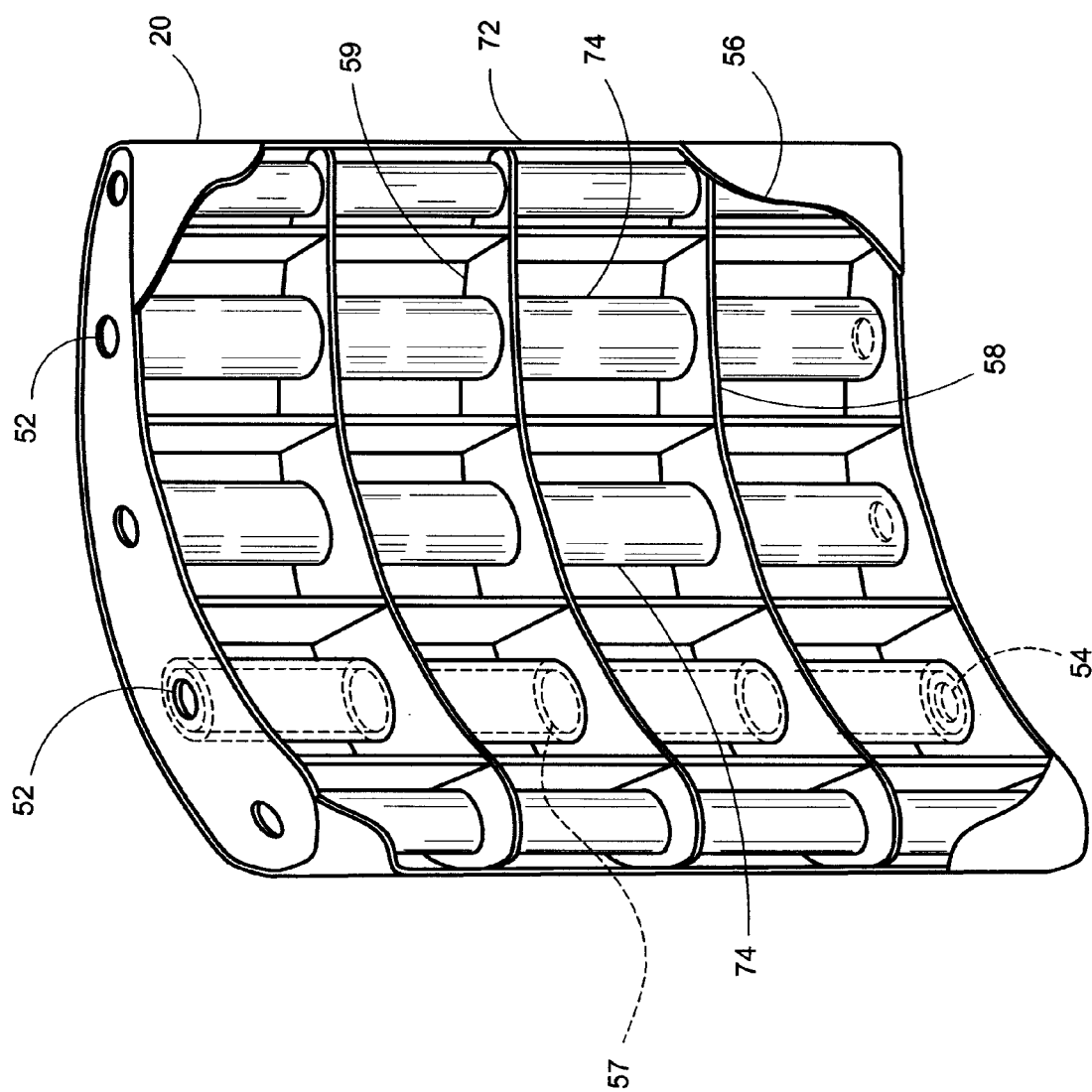
FIG. 5 shows an internal view of a foil with internal ballast chamber cylinders (which internal chambers may be cylindrical, elliptical, oval or foil shaped).
Figure 6:
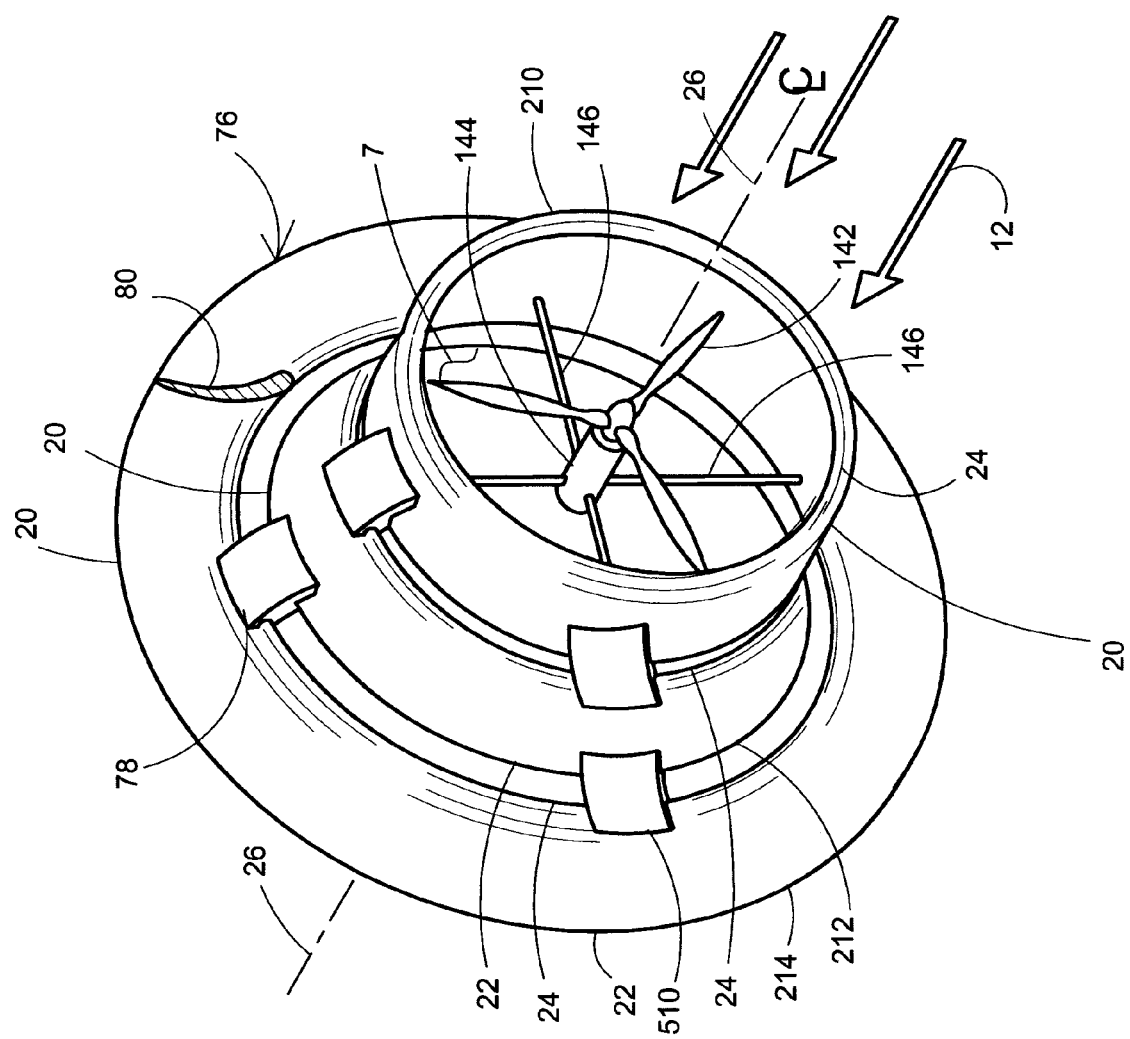
FIG. 6 shows a hydraulic flow electrical generator system with an inline or axial turbine engine axially aligned with an electrical generator set in a nacelle and a radial flow shroud consisting of multiple circumferential ring hydrofoils, wherein the radial shroud enhances water flow through the turbine engine.
Figure 6A:
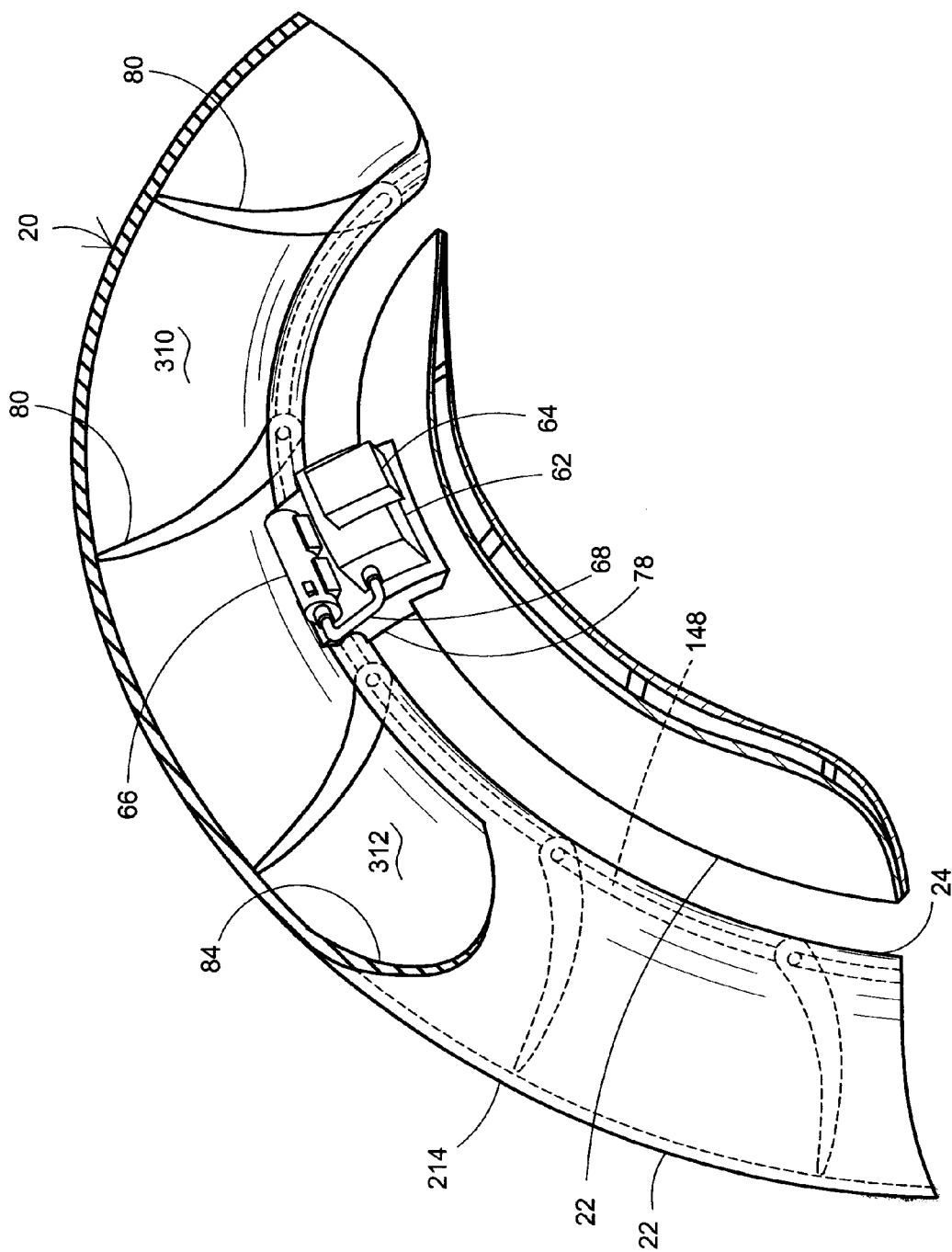
FIG. 6A shows a partial, broken away view of the radial shroud.
Figure 6B:
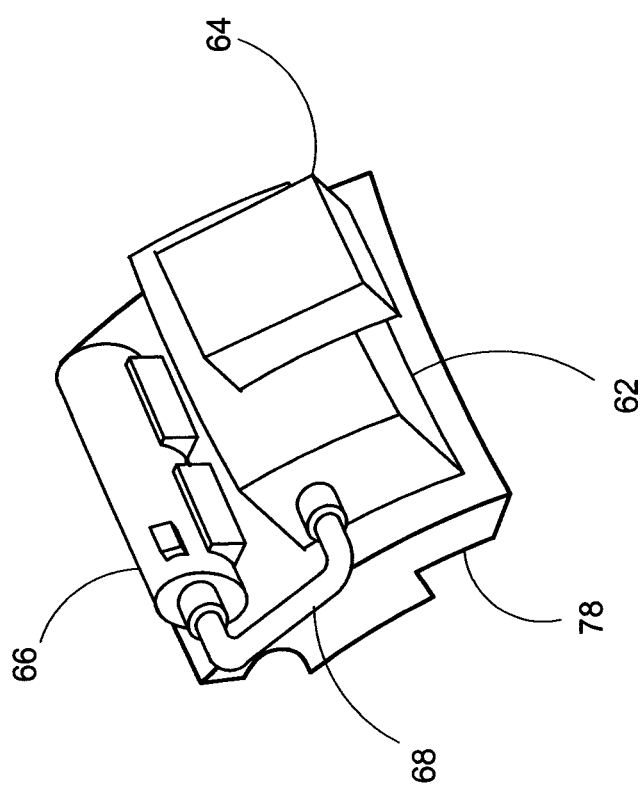
FIG. 6B illustrates a detail of one type of ballast buoyancy control system for the radial shroud.

Further, it should be noted that the concepts regarding hydrofoil construction in FIGS. 3A, 3B, 4, 4A and 5 can be applied equally to the radial flow shroud hydrofoils which are diagrammatically illustrated in FIG. 6A. For example, the radial flow shroud foil 6 in FIG. 6A may include internal stringers with internal ballast passages 138,140 as shown in FIG. 4A or may include internal ballast chambers 74 and shown in FIG. 5.

Figure 1:
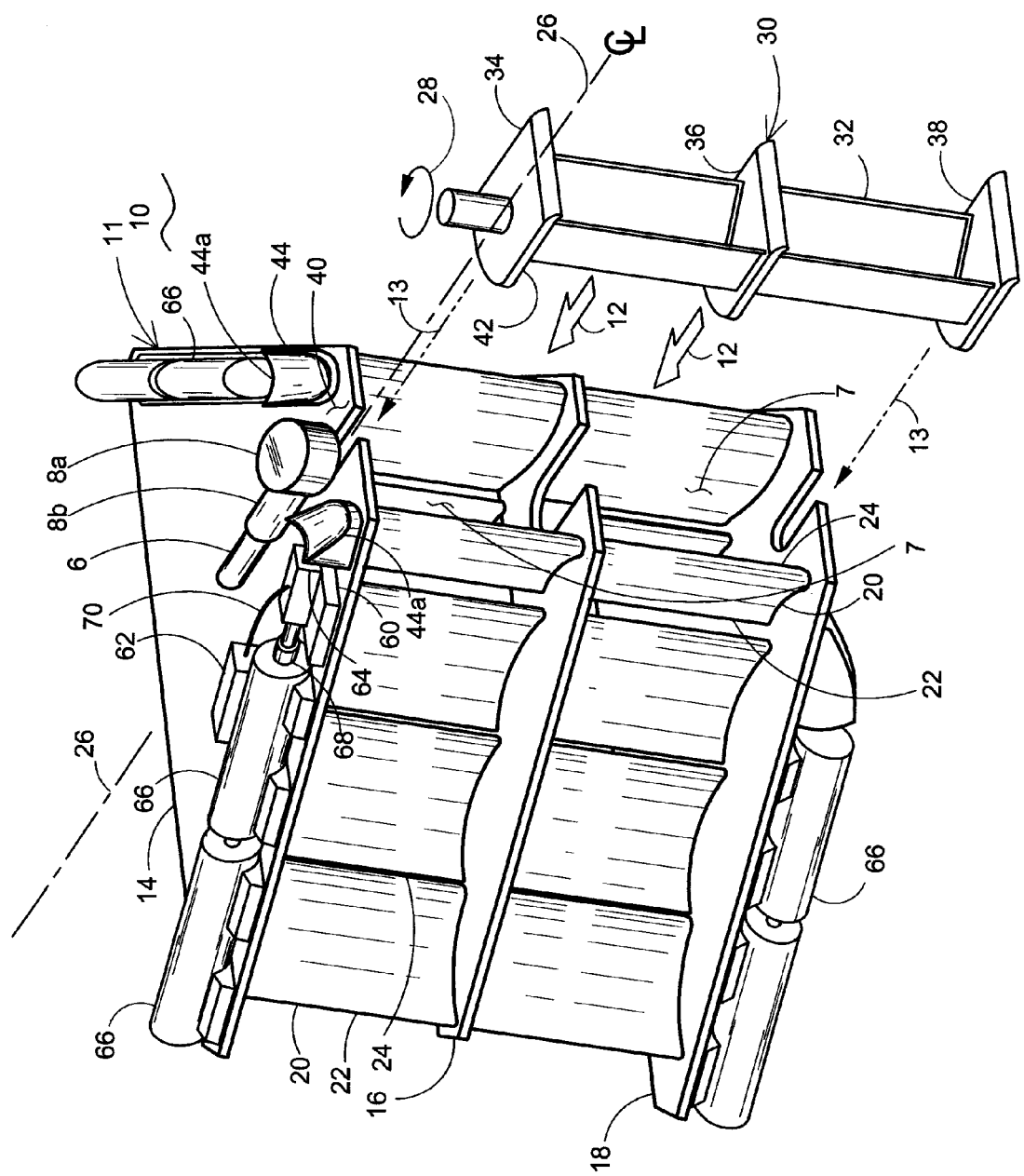
FIG. 1 is a perspective view of a hydraulic flow electrical generation system with a laminar flow shroud consisting of multiple hydrofoils and a rotating panel perpendicular hydraulic turbine, wherein the turbine engine is partly withdrawn from the shroud (an exploded view).
Figure 2:
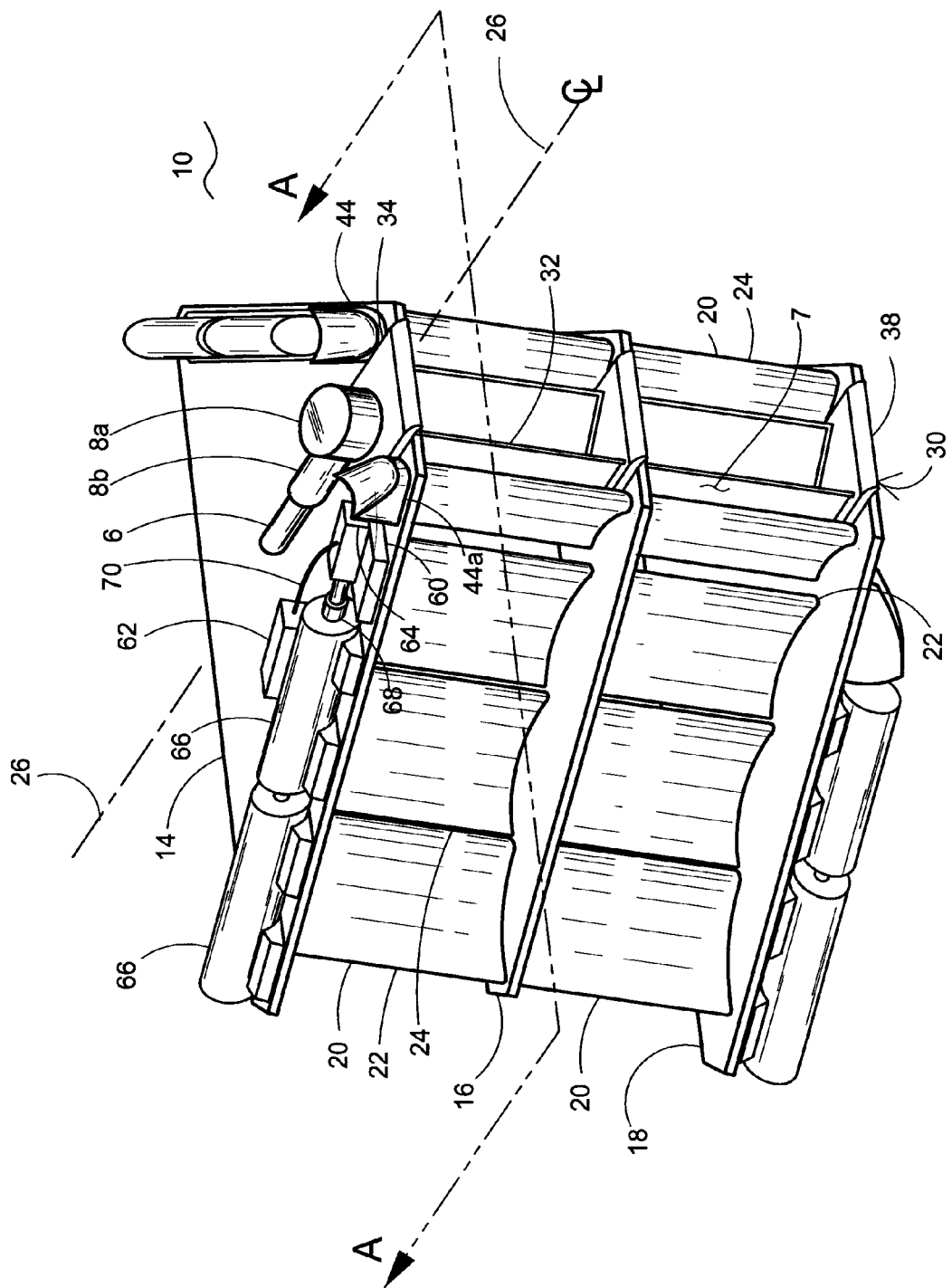
FIG. 2 is a perspective view of the laminar flow shroud with multiple hydrofoils and with the rotating panel hydraulic turbine mounted on or in the shroud.

FIGS. 1 and 2 diagrammatically illustrate a laminar flow kinetic energy conversion system.

In FIG. 1, the laminar flow shroud 11 includes multiple flow hydrofoils 20, a panel type perpendicular turbine engine 30 and buoyancy ballast control units 64, 62. A naturally occurring water current flow 12 moves through shroud 11. The hydrofoils 20 are contained and restrained in shroud 11 by top deck plate 14, mid deck plate 16 and bottom deck plate 18. The hydrofoils are placed so as to enhance current flow 12 through shroud 11. The most forward or primary hydrofoil pair (with opposing foils) is adjacent engine 30. See FIG. 2. The secondary hydrofoil pairs are mounted aft of the primary foils (longitudinally spaced downstream) and each progressive foil pair is laterally spaced apart at a greater distance. The flow of water moves faster through the inboard or interior portion of the shroud, after the flow passes narrow intake passage 7 and past the turbine 30, due to the accelerated water flow over the inboard surfaces of the shroud's hydrofoils, namely accelerated flow over the laterally inboard surfaces and then effect flow in the gaps between each foil. The accelerated flow effects the flow in the progressively laterally wider (larger) interior space of the shroud 11 (see FIG. 2B). This fast water flow is caused by the hydrofoil shape effecting the flow in the increasingly larger lateral spacing between each foil in the respective opposing foil pair. The primary foils are adjacent the engine 30. Accelerated flow of water or fluid comes from the laterally interior or inboard foil surface (the surface nearer the longitudinal centerline) and effects flow through the spaces between the primary foil and the secondary foils. These circumferential foils are sometimes referred to as shrouds since the foil surround the turbine engine-generator set.

The hydrofoils 20 are constructed so as to have a semi-spherical leading end 24 and lagging end 22. See FIG. 2A. The leading end is cross-dimensionally larger than the lagging end 22 of each foil.

The perpendicular panel engine turbine 30 consists of hinged panels 32 (see FIG. 2A). For more details regarding this panel turbine, see U.S. patent application Ser. No. 12/171,908 filed Jul. 11, 2008, the contents of which is incorporated herein by reference thereto.

The panel turbine 30 is mounted to top engine deck plate 34, mid deck plate 36 and bottom deck plate 38 (see FIG. 1). The hydrofoils define the lateral sides of the shroud. Water flow 12 flowing through shroud input region 7 imparts force to the engine which rotates as indicated by arrow 28. Phantom arrows 13 in FIG. 1 (an exploded view) indicate the insertion of the engine to a mounting position on shroud 11 at deck plate regions 40, 42. Centerline 26 is an axis of symmetry of the shroud 11, engine 30 and generally current flow 12. The foils or fins are laterally spaced away from centerline 26. Therefore, flow is vertically laminar (in the z plane) between plates 14, 16, 18. Rotational motion 28 from engine 30 is converted to electrical energy via transmission set 8a, 8b coupled between engine 30 and electrical generator 6. The system to off-load the electrical power is shown as a cable in FIG. 8. Electrical power carrying cables typically carry electrical power off shroud structure 11.

Buoyancy and ballast control for the entire system is obtained by compressed air tank(s) 66, hydraulic valve(s) 64, connector piping 68 and pneumatic manifold 60. Although one buoyancy and ballast control system is shown, the system may be duplicated for each hydrofoil set, one for the left set of foils between deck plates 14, 16, a second for the right side foils, a third for the lower foils between plates 16, 18 and a fourth for the ride sight lower foils. However, as shown in FIG. 4A, each foil may have a source of compressed air, some operable control sub-system for altering valves and a manifold (if the foil has internal ballast chambers per FIG. 5). Therefore, each ballast defining foil may have distinct ballast controls. In FIG. 1, the manifold 60 may extend over the upper deck 14. Otherwise, manifold 60 may be integral with plate 14. Electrical control to actuate the valve 64 is provided through cable 70. Current flow deflectors 44, 44a protect the air tanks 66 and the ballast delivery and control system components 64, 68, 60 from water current 12. The flow deflectors reduce ocean current forces on "flat structured faces" on the leading edge or surfaces of system elements. Some hydrofoils may be empty and not be subject to ballast control and variable ballast.

In FIG. 3A, 3B, 4, the hydraulic foil 20 consists of an outer shell 56 with leading end 24 and lagging end 22 supported by interior struts or stringers 58, 59. Deck Plates 14, 16 and 18 may form the end caps for the hydrofoil or the hydrofoil may have top and bottom closure plates. The shell 56 forms internal ballast chamber 50 in FIGS. 4 and 5. Orifices 138, 140 provide a free flow of air 4 and water in the ballast chamber. The shell 56 defines the ballast chamber. Buoyancy is provided in the form of compressed air 4 introduced through air input port 52. Output water ballast relief ports 54 are indicated to release and accept ambient water as ballast. The location of the air intake ports and ballast relief ports may vary.

Compressed air manifold 60 in FIG. 1 delivers or ports air 4 input into foils 20. Air 4 is provided by pressurized compressed air tanks 66 and the air flow is controlled by valves 62 and controller 64.

As an alternative shown in FIG. 5, internal ballast tube chambers 74 are disposed in the open framework of the foil. See FIG. 5. The internal ballast chambers then become the ballast containers 74 with ports 52 accepting air 4 and ports 58 acting as ballast water control relief ports. These ports 52, 58 in FIGS. 3A, 3B, 4, 4A and 5 may be valved ports also under the control system shown in FIG. 9. The ballast chambers 74 may be cylindrical, oval, elliptical or foil shaped. Spheroid ballast chambers maybe used in the radial shroud foils in FIG. 6A.

In one embodiment of the invention, the design is planned to extract kinetic energy at a base flow level of one (1) meter per second (about 2 knots) which, when enhanced or amplified by a surrounding shroud concentrator, increases the velocity of the water flow through the turbine engine. It is estimated that at these base current flows, about 1 MW of power can be generated by the system. Since most locations in the world have lower velocity waters, the prior art turbines, which are designed to work with fast water flows of 3, 4, or 5 meters per second (6, 8 or 10 knots), will not work in low velocity conditions of 1-2 meters per second (2-4 knots). The present system is designed to operate underwater in low water velocity situations 1-2 meters per second (2-4 knots). At higher velocities, control features described herein may not be adequate to dampen vibration and control direction and depth control.

Turbines which may be used with the controlled buoyancy systems described herein may include the perpendicular axis turbine, a Gorlov helical turbine, a Darrieus turbine and the illustrated axial inline turbine, sometimes called a radial turbine.

Water currents in the open ocean usually differ from the ocean floor versus the ocean surface. Generally, maximum ocean currents are found near the surface depths and slower moving currents are found near the bottom of the ocean. The hydrokinetic energy conversion system is not a surface penetrating system in its operational mode. However, the system is designed to float on or atop the water for repair and maintenance.

The present design of the hydrokinetic energy conversion system is designed to be submerged at a minimum depth of approximately 30 meters (approximately 100 feet) below the ocean surface. At this depth, the system is submerged at a depth sufficient to allow safe leeway for standard shipping traffic to clear the system. Further, at this depth, the system is effectively free from the effects of the surface environment. Relatively constant current flows at these depths can be found in certain geographic territories around the world. In these areas, there is a relatively consistent low flow ocean currents as well as a need for additional electrical power generation. Ideal depths of operation are generally between approximately 30 meters to approximately 200 meters below sea level. At those depths, the remaining sunlight is greatly reduced, thereby limiting marine growth, and biofouling of the system components.

The present hydrokinetic energy conversion system is designed to be brought to the surface, under the buoyancy controls described herein, for maintenance or upgrade purposes and then re-submerged to be placed back in service. Due to its modular structure, the engine module may be removed and replaced on location with either a replacement or upgraded engine. The same is true with the electrical generation system which is only diagrammatically illustrated herein. The removed engine module can then be brought back to a shipyard and be either upgraded or repaired and then kept in storage for later use. In other circumstances, the hydrokinetic energy conversion system may be towed into a dry dock for repair or replacement of parts.

The laminar flow shroud may be configured in various ways. For example, the laminar shroud may include only a singular laminar flow system defined by upper deck plate 14 and a lower deck plate (omitting mid-section deck plate 16). Further, although three secondary hydrofoils are shown downstream from the primary, leading hydrofoils adjacent engine 30, the system may include only a primary and a single secondary hydrofoil pair (a secondary, downstream hydrofoil pair). Further, the compressed air tanks may be defined by chambers in the hydrofoils themselves. In this situation, and referring to FIG. 4A, a third hydrofoil containment unit would encompass a compressed air tank, and the hydraulic valve 62 would be controlled by valve actuators in a control system and by an electrical control system 64 (not shown in FIG. 4A). Valve 62 may include valve actuators and these valve actuators may be controlled by control system 64. Also, manifold 60 may include direct piping or may include intermediate control valves directing air input and air egress from the internal ballast chamber defined by shell 56 in FIG. 4A. The system may include many stacks of shrouds (two shown herein, but the system may be expanded to three, four or more). Also, stacked panel turbines may be used.

With respect to water ballast relief port 54 in FIG. 3B, those relief ports may be disposed at other locations on the hydrofoil.

With respect to FIG. 4, the internal ballast flow passages 138, 140 may be at different locations as shown in the figures.

With respect to FIG. 5, the internal ballast chambers 74 may be cylindrically shaped or may be elliptically shaped or may be an oval r may be foil shaped. Further, these internal ballast chambers 74 may include internal stringer systems to better provide support to hydrofoil 20.

FIGS. 6, 6A and 6B diagrammatically illustrate a radial flow shroud used in connection with an inline or axial turbine 142. Water flow through shroud system 210, which includes one or more hydrofoils, is enhanced by accelerated flow over the inboard surface of each hydrofoil, which accelerated flow is fed into the generally frustoconical interior space of the shroud between a leading foil (the first leading foil being the primary foil) and the next sequential lagging or following foil (a secondary foil). The generally frustoconical interior of the radial shroud system has an increasingly larger internal diameter defined by the circumferential hydrofoil rings. In other words, the primary foil has a smaller diameter as compared with the secondary foil and the secondary is smaller than the tertiary, etc. Turbine 142 spins based upon current flow through the primary circumferential ring shroud 210. An electrical generator (not shown) is mounted within nacelle 144. The entire turbine-generator system is held on an axial centerline with respect to the entire radial shroud by one or more struts 146. Additional struts and foils may be utilized.

The radial flow hydrofoil configuration is used with an inline or axial turbine engine 142 in hydraulic generator system 76. The radial shroud system 20 includes a primary circumferential ring foil 210 and secondary circumferential ring foils 212, 214. The foils 210, 212, 214 (which may be considered shrouds) and turbine 142 all have the same axial centerline. FIG. 6A shows foil 214 with an outer shell 84 supported by interior struts or stringers 80. The struts define radial segments in the foil. These radial segments are flooded, fully or partly, by ballast water thereby controlling the buoyancy of the system. The radial shrouds have a leading end 24 and a lagging end 22. The leading end 24 is cross-sectionally larger than lagging end 22.

The radial hydrofoils 20 are retained and supported by supports or braces 78 between the foils forming the shroud. Struts 146 connect the hydrofoils to electrical generator 144 in the nacelle located on the axial centerline 26 of the shroud. Underwater current 12 flowing into the shroud at input area 7 activates engine turbine blades 142 thereby driving the electrical generator 144 in the nacelle.

In FIG. 6A, buoyancy control is provided by air pressure tanks 66 and the air is controlled by hydraulic valves 62 and controller 64 through piping 68. Manifold piping 68 delivers compressed air as a buoyancy element to the radially segmented chambers 310, 312. Ballast is provided by ambient water accepted or ejected based upon reduction or injection of compressed air via the ballast control system. Ports 52, 54 (FIG. 4) respectively enable air and water flow into and out of the radial segments.

With respect to FIG. 6A, compressed air tank 66 supplies compressed air to valve system 62 and a manifold. The manifold is not shown in FIG. 6A but defined in the interior of shroud brace 78. Internal manifold piping 148 delivers air which controls buoyancy for the system to the radial segments 310, 312 of shroud 214 divided by struts 80. Therefore, the area in radial segment 310 could be used for buoyancy and balance control with different ballast controls applied to internal buoyancy and balance chamber 312.

As an alternative to the mounted control brace system shown in FIG. 6A, the circumferential hydrofoils could include, in an interior section, compressed air tanks 66, valves 62 and electrical control system 64 as shown in hydrofoil containment 61 in FIG. 4A. Further, the manifold 60 and 148 could be much more complex than the single lines 148 extending through radial segment positions shown in the drawings and discussed earlier. FIG. 6B diagrammatically shows air tank 66, electrical control 64, valve system 72 all mounted atop shroud brace 78.

FIGS. 7 and 8 diagrammatically show various mooring systems which can be used in conjunction with either the laminar flow shroud or the radial flow shroud. In FIG. 7, a drag line mooring system 88 uses chain 94 attached to shroud 10 in conjunction with line 90 attached to suction type anchor 92. The chain acts as a chain ballast clump weight as a passive stabilization system. The buoyancy control provides a means of positional control at some optimum depth d1. In FIG. 8, a pile mooring system 96 using a pile anchor 98 in place of chain 94 can be used. Power cable 710 is shown in FIG. 8 to off-load electrical power. Communications lines may also be added to cable 710. As stated earlier, a typical depth for the hydrokinetic energy conversion system is about 30 m. In these situations, the shroud, whether laminar flow or radial flow, must be moderately stabilized to capture ocean currents. The depth d1 to ocean floor in one embodiment is calculated to be about 60 m-180 m. The system may be disposed at any operative ocean depth to capture ocean current flow. Suction pile anchor 92 is tied of with cable 90 to the shroud and engine combination. Additionally, a surface ocean buoy may be floated on water surface 420. The mooring system could be a drilled and grouted anchor pile or may be a suction anchor pile. The electrical power cable could lay loosely on the bottom of the ocean floor 424 and lead to land.

In the illustrated embodiment in FIG. 7, the loose anchor chain 94 provides a variable stabilization chain stabilizing pitch, yaw and roll as well as a damper for changes in depth as a variable weight. The more shroud 10 rises above sea floor 424, the greater weight chain 94 applies to the system. In other words, the more chain that is lifted off the ocean floor, the greater downward weight is applied and greater force applied to conversion system 10.

FIG. 8 diagrammatically shows a grouted and drilled anchor pile 98 as well a section anchor pile 92.

In addition to the mooring systems described herein, mooring systems used for mooring floating oil rigs, floating buoys or floating windmill systems may be employed.

With respect to the radial shroud, the cables 90 and 90A could be attached to opposing braces one of which is brace 510 on the left side of foil 76. The other brace is 180 degrees opposite brace 150. The mooring lines 90, 92 (FIG. 8) could be attached to those opposing braces, one of which is brace 510.

Figure 8A:
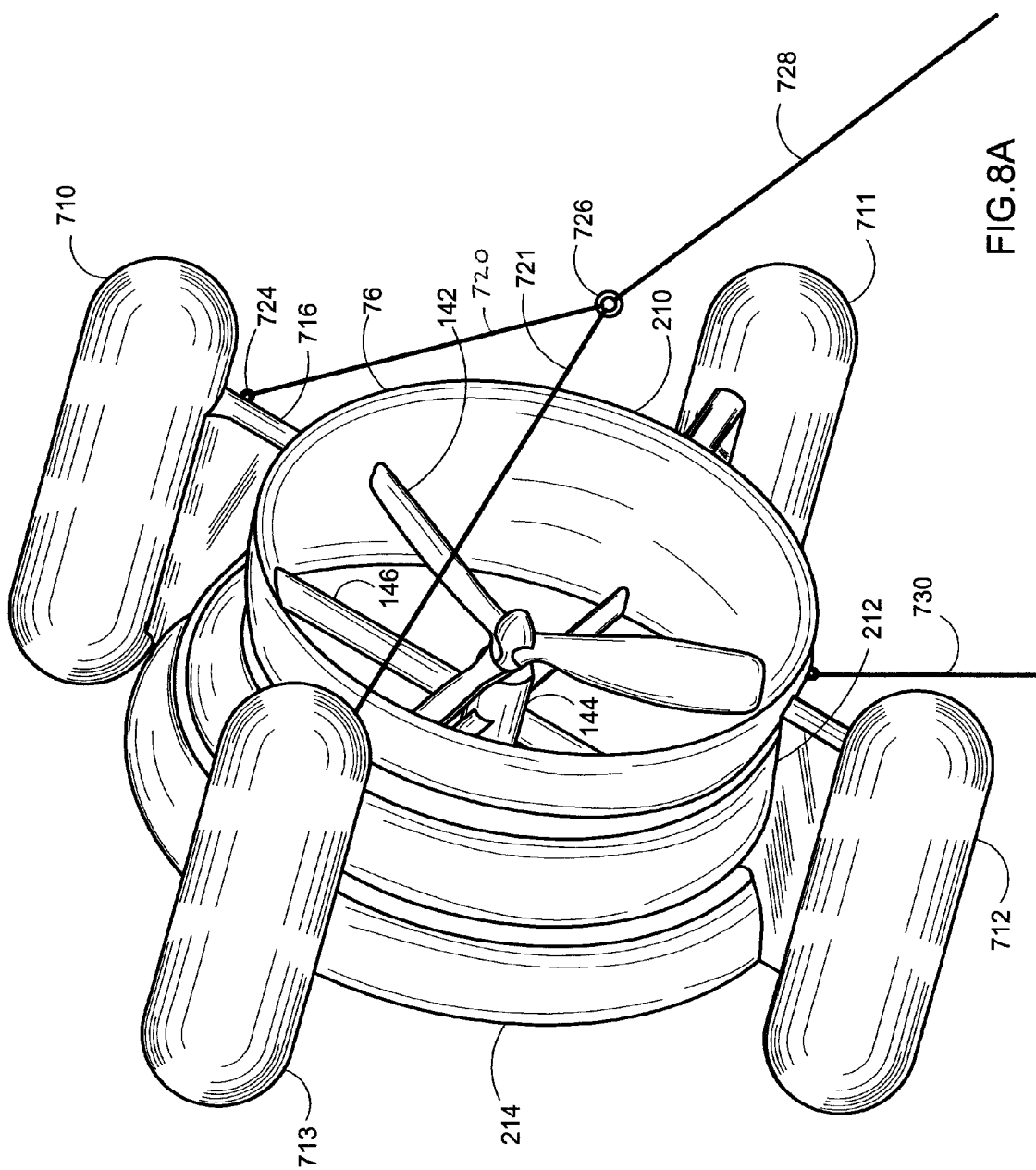
FIG. 8A is a perspective view of the radial shroud with a number (a plurality) of ballast control pods or tanks disposed on the outboard sides fo the radial shrouds.

FIGS. 8A to 8E illustrate another embodiment of the invention including one or more ballast pods mounted outboard of the radial shroud. FIG. 8A is a perspective view of radial foils 210, 212, 214 forming the shroud with a number (a plurality) of ballast control pods or tanks 710, 711, 712, 713 disposed on the outboard sides of the radial foils. Pod brackets, one of which is bracket 716, mount the pods 710, 711, 712, 713 on the foils and generally on the shroud system.

In the illustrated embodiment, a bridle and fairlead mooring attachment is used which includes bridle 720, mounted to D or O rings 724 on either the pod or the support bracket 716. Bridle 720 passes through the fair lead 728 via ring coupling 726. This bridle-fairlead mooring attachment permits a self balancing or self-righting mooring attachment. Down-line mooring cable 730 leads to a convention mooring system in the ocean floor.

Figure 8B:
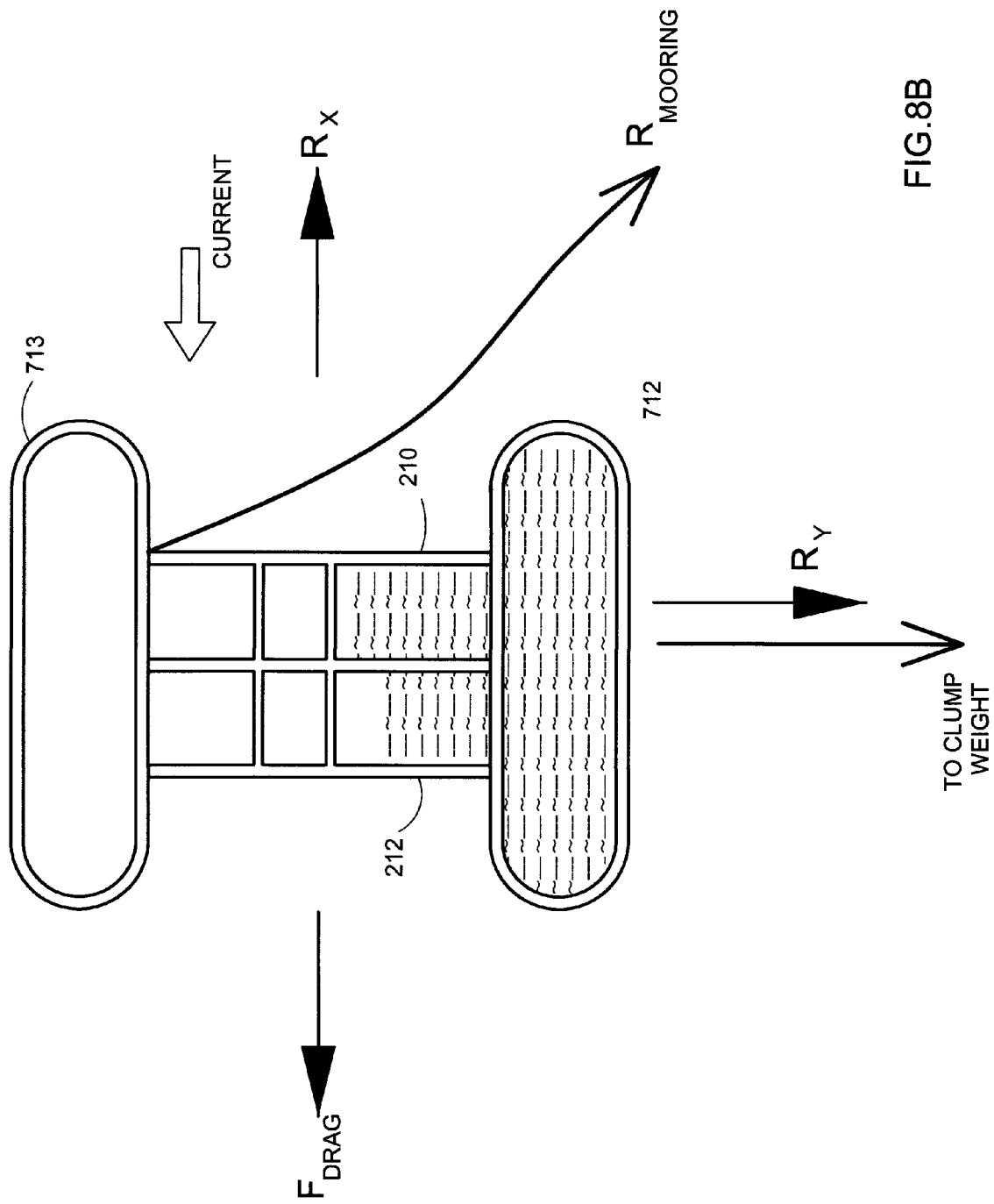
FIG. 8B diagrammatically illustrates a side elevational view of the ballast pods with a primary and a secondary radial foil system (a two (2) foil shroud system), showing variable water ballast levels in the primary and secondary foil shrouds and ballast in the lower ballast pod.
Figure 9:
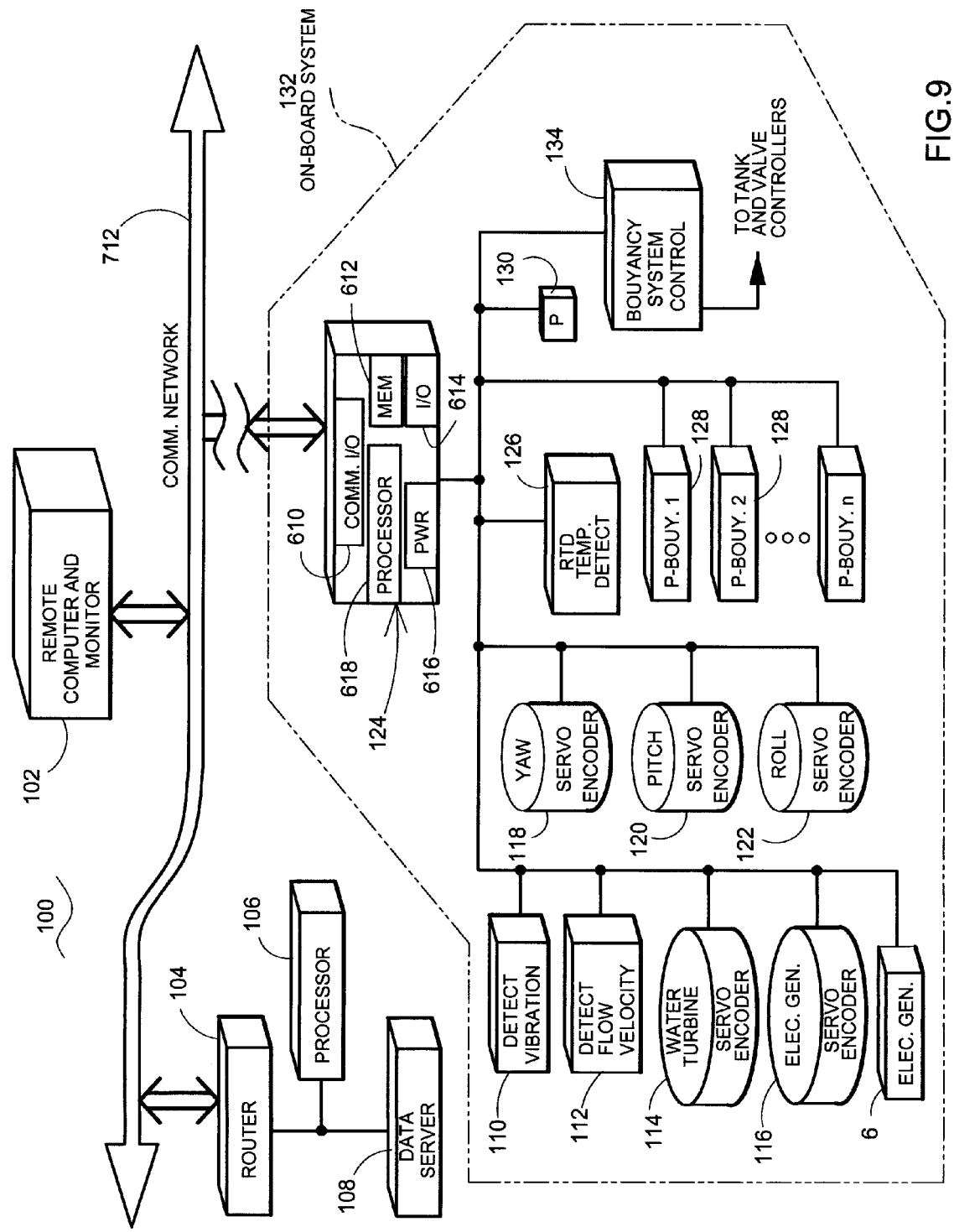
FIG. 9 diagrammatically illustrates a basic process control system for a hydraulic flow engine with controllable ballast.

FIG. 8B diagrammatically illustrates a side elevational view of the ballast pods 713, 712 with primary radial foil 210 shown diagrammatically next to secondary foil 212. A variable water ballast level is shown in the primary and secondary foils. Further, water ballast is shown in lower ballast pod 712. It should be noted that the present ballast system may include hard ballast tanks, which substantially permanently retain air (and do not accept water ballast) and soft ballast chambers in which water ballast is inserted or rejected under control of the system described in FIG. 9. Various forces acting on the kinetic engine are shown in FIGS. 8B and C.

Figure 8C:
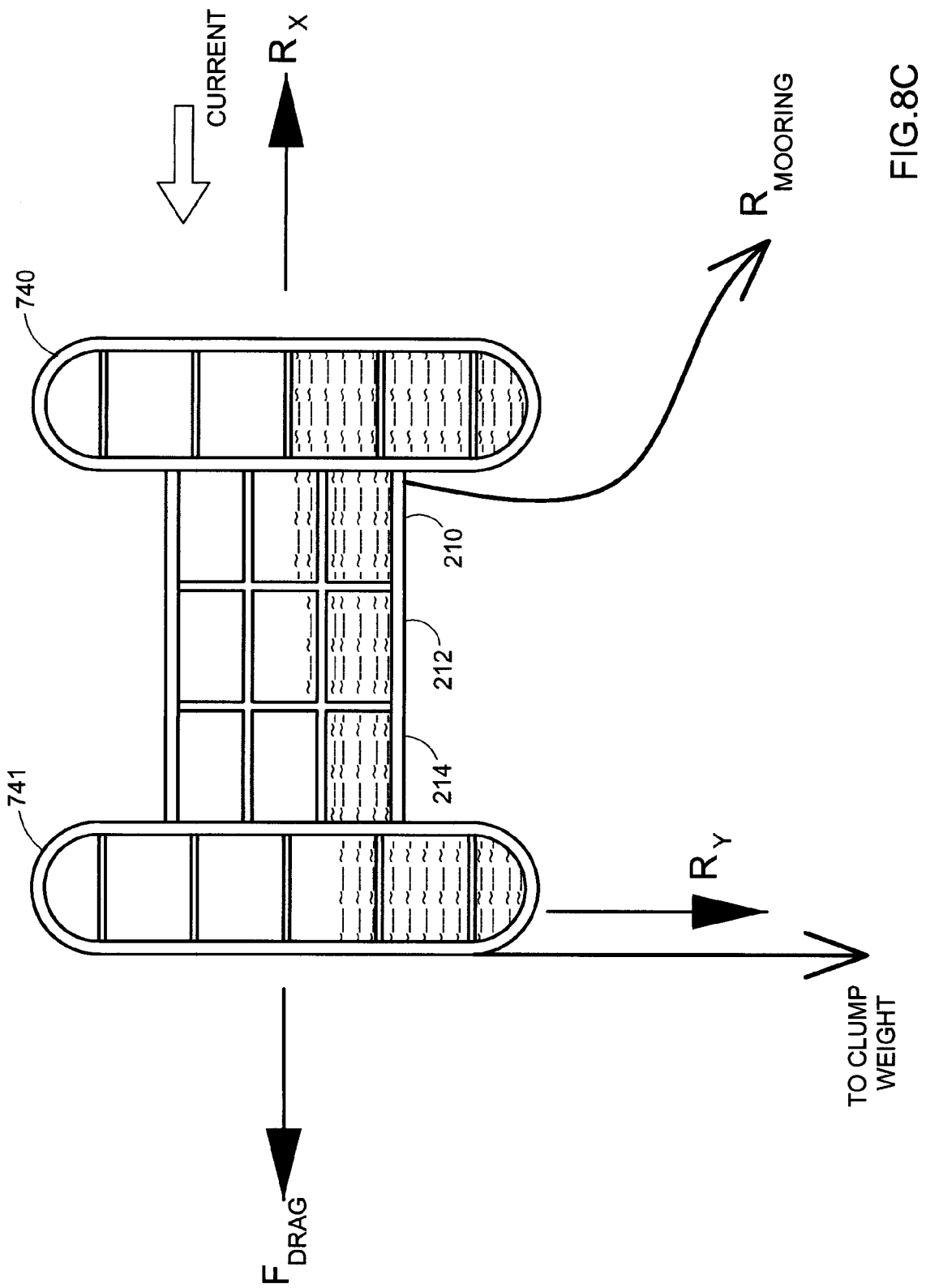
FIG. 8C diagrammatically illustrates a side elevational view of a different pod configuration, that is, a forward and an aft ballast pod and primary, secondary and tertiary radial foil system, showing variable water ballast levels in the shroud ballast chambers ballast in the fore and aft ballast pods.

FIG. 8C diagrammatically illustrates a side elevational view of a different pod configuration, that is, a forward ballast pod 740 and an aft ballast pod 741. Primary, secondary and tertiary radial foils 210, 212, 214 are diagrammatically illustrated as having different levels of ballast. The same is true of fore and aft ballast pods 740, 741.

Figure 8D:
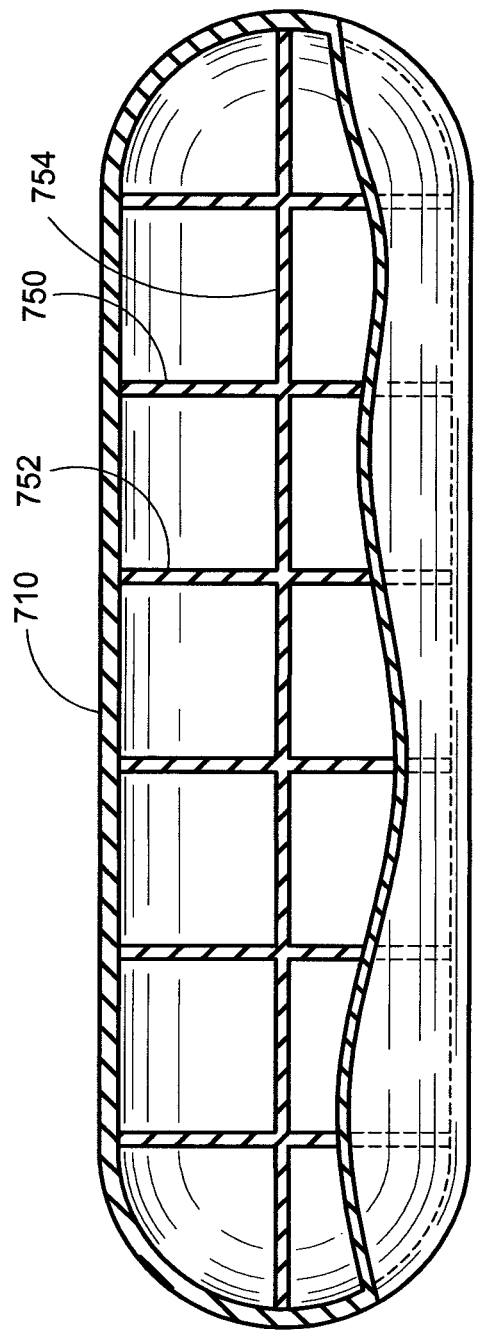
FIG. 8D diagrammatically illustrates an interior view of a ballast pod.

FIG. 8D diagrammatically illustrates an interior view of a ballast pod with interior vertical stringers 750, 752 and horizontal stringers 754. As discussed earlier, these stringers may define interior ballast chambers in the pod, similar to the stringers in the foils. See FIG. 4, 5.

Figure 8E:
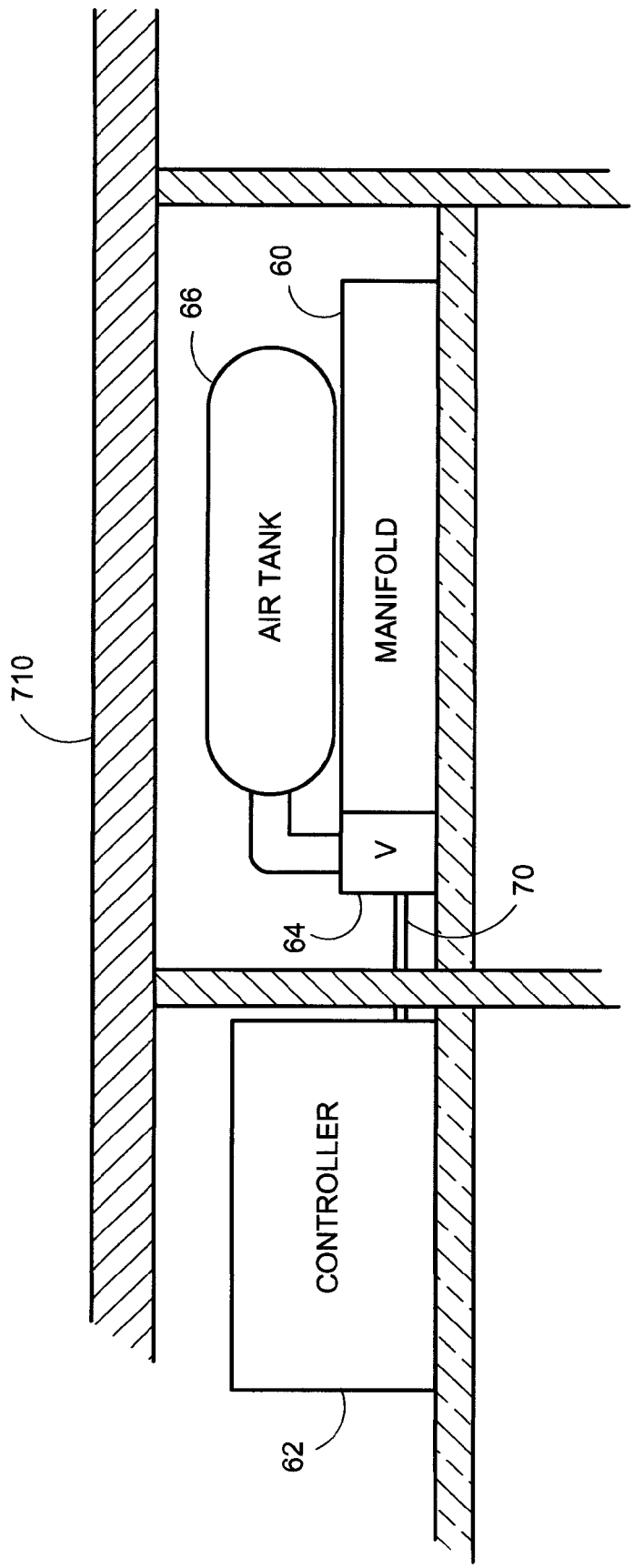
FIG. 8E diagrammatically illustrates ballast controls, compressed air tank supply, valve and manifold air distribution system for the ballast. It should be noted that the internal ballast controls, compressed air tank supply, valve and manifold air distribution system may be present in the laminar shrouds (FIG. 1) and the radial shrouds (FIG. 6).

FIG. 8E diagrammatically illustrates ballast control 62, compressed air tank supply 66, valve 64 and manifold air distribution system 60 for the ballast. Control signals are applied to the valves via control line or cable 70. It should be noted that the internal ballast controls, compressed air tank supply, valve and manifold air distribution system may be present in the laminar shroud system (FIG. 1) and the radial shroud system (FIG. 6).

The hydrokinetic conversion system is subjected to a reasonably wide variety of ocean current flows and those flows change in depth at certain times and over certain seasons. Further, the flows meander having different flow directions at different times of day and times of season. Therefore, it is necessary to provide a buoyancy and ballast control system that has onboard controls. These controls would inject air into one or more foils while releasing air from opposing foils thereby "rolling" the shroud and mounted engine in one direction. Depth control is provided by releasing foil contained air and taking on ballast in ballast chambers.

In FIG. 9, a process diagram is provided for such control system. The central control sub-system 124 includes communications input/output 610, onboard memory 612 and input/output (I/O) processing unit 614. Power is supplied as onboard unit 616 which may include batteries charged by electrical generator 6. Further, power may be supplied from a landside source. See FIG. 8, power and control cable 710. Central processor 618 executes computer programs in order to control the pitch, yaw and roll and depth of the shroud and to process the data. A yaw sensor 118 is preferably a sever encoder which generates control signals based upon the yaw of the overall shroud system. A pitch sensor 120 also encode typically includes a server encoder. A roll sensor 122 utilizes a similar encoder. Other sensors may be utilized but these encoders are current sensors found in marine and aircraft systems. The temperature sensor 126 is typically a RTD sensor. Buoyancy control units 128a and 128b and buoyancy control unit n generally activates signals effecting electrical control system 64 discussed above and particularly in connection with FIG. 1 and FIG. 6A. The control units process algorithms to operate ballast valve actuators (the air valves).

Pressure sensor 130 determines the underwater pressure which is utilized by the buoyancy control system 134. Buoyancy control system 134 applies conditioned control signal to the valves to open and close and inject compressed air into the ballast chambers or to release compressed air from the ballast chambers. Relief valves for the air may be included in the laminar flow hydrofoils and the radial flow circumferential hydrofoils. Relief valves are not illustrated. Buoyancy controls 128a and 128b represent the algorithm to generate the valve control signals. The buoyancy system control 134 provides conditioned signals to the valve. It is known that in digital controls, the signals are small voltages and currents. However, to control the actuator in a valve, a much larger control signal is applied to move the valves.

Central control unit 124 also includes vibration detection system 110, a flow velocity sensor 112 and various sensors on the water turbine. These water turbine sensors are generally identified as a single sensor 114. Also, the electrical generator would have a number of sensors on it and one of them may be a server encoder sensor 116.

Central control 124 is generally carried onboard as noted by onboard system outline 132. A communications network 712 is coupled to the central control 124. This may be through wire cable or sonar or other communications link. Generally, communications network 712 represents the interne or any wide area telecommunications system. The communications network 172 is tied via router 104 to processor 106. A daily server 108 collects all the data from the onboard platform 132 as transmitted to it from central processor 124. The system may be remotely controlled by remote computer and monitor 102.

Approximate design specifications for one embodiment of the invention are provided below as examples.

Specification Table 4 knot system: dry weight 2.0 million pounds, wet weight 1.7 million pounds
2 knot system: dry weight 4.2 million pounds, wet weight 3.6 million pounds
Laminar flow: width at output 70 m -continued Specification Table Height 40 m
Approximate length aft 30 m
Radial shroud: diameter 30 m to 20 m
Radial shroud axial length 20 m The system herein may include hard ballast tanks, which establish a neutral buoyancy for the entire system (or nominally positive or nominally negative buoyancy, as programmed by the ballast control system) and include the soft ballast tanks having variable pressure. The foil shell is designed to encompass these hard ballast tanks and the variable or soft ballast tanks.

The claims appended hereto are meant to cover modifications and changes within the scope and spirit of the present invention.

What is claimed is:

1. In combination with an inline turbine coupled to an electrical generator and a radial water flow shroud channeling water current flow about the inline turbine, a ballast and buoyancy system comprising:
   a plurality of circumferential hydrofoils with a primary circumferential hydrofoil disposed proximal said turbine, the remaining circumferential hydrofoils disposed downstream said primary circumferential hydrofoil, each hydrofoil having an inboard flow acceleration surface adapted to accelerate water flow through said shroud and downstream away from the turbine, the remaining circumferential hydrofoils defining secondary circumferential hydrofoils;
   a plurality of struts mounting said turbine on or about said axial centerline of said primary circumferential hydrofoil;
   a plurality of shroud braces mounting said primary circumferential hydrofoil to an adjacent secondary circumferential hydrofoil and mounting other adjacent secondary circumferential hydrofoils to each other;
   a plurality of ballast chambers defined in interior spaces of some or all of said circumferential hydrofoils, each ballast chamber having a gas intake port and a water ballast output port, said ballast port permitting the ingress or egress ambient water as ballast for the ballast defining circumferential hydrofoils;
   a source of compressed air provided to said radial shroud;
   a plurality of valves intermediate said source of compressed air and said ballast chambers, said valves controlling the flow of air into said ballast chambers and the release of air from said ballast chambers; and
   a control system with sensors as control inputs monitoring depth or elevation above an ocean floor, pitch, yaw and roll of said radial shroud, said control system generating valve control commands to respective valves to inject or release air to and from corresponding ballast chambers in respective ballast defining circumferential hydrofoils.

2. The combination as claimed in claim 1 wherein each secondary circumferential hydrofoil is progressively longitudinally spaced apart with respect to said axial centerline and each progressively longitudinally spaced apart circumferential hydrofoil having respective progressively greater diameters compared with said primary circumferential hydrofoil.

3. The combination as claimed in claim 1 wherein said source of compressed air includes a plurality of air tanks, said air tanks mounted either on or in respective ones of said plurality of shroud braces.

4. The combination as claimed in claim 3 wherein the ballast and buoyancy system includes a manifold for distributing said compressed air from said valves to said ballast defining circumferential hydrofoils.

5. The combination as claimed in claim 1 wherein each circumferential hydrofoil includes internal stringers providing an internal support web therefor, and said ballast chamber in each said ballast defining circumferential hydrofoil is an internal ballast chamber nested within the respective stringers.

6. The combination as claimed in claim 1 wherein said source of compressed air, said plurality of valves and said control system is mounted either within or on one or more of said circumferential hydrofoils.

7. The combination as claimed in claim 6 wherein said source of compressed air includes a plurality of air tanks, said air tanks mounted either in or on said respective ones of said one or more of said circumferential hydrofoils.

8. The combination as claimed in claim 7 wherein said ballast and buoyancy system includes a plurality of manifolds for distributing said compressed air from said valves to said ballast defining circumferential hydrofoils.

9. The combination as claimed in claim 8 including a chain ballast attached to said shroud as a passive stabilization system.

10. The combination as claimed in claim 7 including a bridle and fairlead mooring attachment.

11. The combination as claimed in claim 1 including one or more ballast pods coupled to an outboard region of said shroud, each ballast pod having one or more ballast pod chambers defined in an interior pod space and each ballast chamber having a gas intake pod port and a water ballast output pod port, said ballast pod port permitting the ingress or egress ambient water as ballast;
   said valves controlling the flow of air into said ballast pod chambers and the release of air from said ballast pod chambers; and
   said control system generating valve control commands to respective valves to inject or release air to and from corresponding ballast pod chambers.

12. The combination as claimed in claim 11 wherein said one or more ballast pods are a plurality of ballast pods symmetrically disposed about said radial shroud.

13. The combination as claimed in claim 11 including a bridle and fairlead mooring attachment.

14. A hydrokinetic energy system adapted to be placed under water and subjected to water current flow there through comprising:
   an inline turbine coupled to an electrical generator;
   a radial water flow shroud made of a plurality of circumferential hydrofoils channeling water current flow through and beyond said turbine;
   a ballast and buoyancy system including a plurality of circumferential hydrofoils with a primary circumferential hydrofoil disposed proximal said turbine, the remaining circumferential hydrofoils disposed downstream of said primary circumferential hydrofoil and directing accelerated water flow into the shroud's interior, the remaining circumferential hydrofoils defining secondary circumferential hydrofoils;
   a plurality of struts mounting said turbine on or about said axial centerline of said primary circumferential hydrofoil;
   a plurality of shroud braces mounting said primary circumferential hydrofoil to an adjacent secondary circumferential hydrofoil and mounting other adjacent secondary circumferential hydrofoils to each other;

a plurality of ballast chambers defined in interior spaces of some or all of said circumferential hydrofoils, each ballast chamber having a gas intake port and a water ballast output port, said ballast port permitting the ingress or egress ambient water as ballast for the ballast defining circumferential hydrofoils;

a source of compressed air provided to said radial shroud;

a plurality of valves intermediate said source of compressed air and said ballast chambers, said valves controlling the flow of air into said ballast chambers and the release of air from said ballast chambers; and a control system with sensors as control inputs monitoring depth or elevation above an ocean floor, pitch, yaw and roll of said radial shroud, said control system generating valve control commands to respective valves to inject or release air to and from corresponding ballast chambers in respective ballast defining circumferential hydrofoils.

15. The hydrokinetic energy system as claimed in claim 14 wherein each secondary circumferential hydrofoil is progressively longitudinally spaced apart with respect to said axial centerline and each progressively longitudinally spaced apart circumferential hydrofoil having respective progressively greater diameters compared with said primary circumferential hydrofoil.

16. The hydrokinetic energy system as claimed in claim 14 wherein said source of compressed air includes a plurality of air tanks, said air tanks mounted on or in respective ones of said plurality of shroud braces.

17. The hydrokinetic energy system as claimed in claim 16 including a plurality of manifolds for distributing said compressed air from said valves to said ballast defining circumferential hydrofoils.

18. The hydrokinetic energy system as claimed in claim 14 wherein each circumferential hydrofoil includes internal stringers providing an internal support web therefor, and said ballast chamber in each said ballast defining circumferential hydrofoil is an internal ballast chamber nested within the respective stringers.

19. The hydrokinetic energy system as claimed in claim 14 wherein said source of compressed air, said plurality of valves and said control system is mounted within or on one or more of said circumferential hydrofoils.

20. The hydrokinetic energy system as claimed in claim 19 wherein said source of compressed air includes a plurality of air tanks, said air tanks mounted in or on said respective ones of said one or more of said circumferential hydrofoils.

21. The hydrokinetic energy system as claimed in claim 20 including a plurality of manifolds for distributing said compressed air from said valves to said ballast defining circumferential hydrofoils.

22. The hydrokinetic energy system as claimed in claim 21 including a chain ballast attached to said shroud as a passive stabilization system.

23. The hydrokinetic energy system as claimed in claim 14 including one or more ballast pods coupled to an outboard region of said shrouds, each ballast pod having one or more ballast pod chambers defined in an interior pod space and each ballast chamber having a gas intake pod port and a water ballast output pod port, said ballast pod port permitting the ingress or egress ambient water as ballast;

said valves controlling the flow of air into said ballast pod chambers and the release of air from said ballast pod chambers; and said control system generating valve control commands to respective valves to inject or release air to and from corresponding ballast pod chambers.

24. The hydrokinetic energy system as claimed in claim 23 wherein said one or more ballast pods arc a plurality of ballast pods symmetrically disposed about said radial shroud.

25. The hydrokinetic energy system as claimed in claim 23 including a bridle and fairlead mooring attachment.

26. The hydrokinetic energy system as claimed in claim 14 including a bridle and fairlead mooring attachment.

27. In combination with an inline turbine coupled to an electrical generator and a radial water flow shroud channeling water current flow about the inline turbine, a ballast and buoyancy system comprising:

a plurality of circumferential hydrofoils with a primary circumferential hydrofoil disposed proximal said turbine the remaining circumferential hydrofoils disposed downstream said primary circumferential hydrofoil each hydrofoil having an inboard flow acceleration surface adapted to accelerate water flow through said shroud and downstream away from the turbine, the remaining circumferential hydrofoils defining secondary circumferential hydrofoils;

a plurality of struts mounting said turbine on or about said axial centerline of said primary circumferential hydrofoil;

a plurality of shroud braces mounting said primary circumferential hydrofoil to an adjacent one of the secondary, circumferential hydrofoils and mounting other downstream adjacent secondary circumferential hydrofoils to each other; and a plurality of ballast chambers defined in interior spaces of some or all of said circumferential hydrofoils, each ballast chamber using ambient water as ballast under a controlled application of gas therein.

28. The combination as claimed in claim 27 wherein each secondary circumferential hydrofoil is progressively longitudinally spaced apart with respect to said axial centerline and each progressively longitudinally spaced apart circumferential hydrofoil having respective progressively greater diameters compared with said primary circumferential hydrofoil.

29. The combination as claimed in claim 27 wherein a source of compressed air is used to control the water ballast.

30. The combination as claimed in claim 29 wherein the ballast and buoyancy system includes a manifold for distributing said compressed air from said valves to said ballast chambers.

31. The combination as claimed in claim 29 wherein said source of compressed air and a ballast control system is mounted either within or on said ballast chamber.

32. The combination as claimed in claim 31 wherein said ballast and buoyancy system includes a plurality of manifolds for distributing said compressed air from said valves to said ballast chambers.

33. The combination as claimed in claim 32 including a chain ballast attached to said shroud as a passive stabilization system.

34. The combination as claimed in claim 27 wherein each circumferential hydrofoil includes internal stringers providing an internal support web therefor.

35. The combination as claimed in claim 27 wherein said one or more ballast chambers are a plurality of ballast chambers symmetrically disposed about said radial shroud.

* * * * *